(12) United States Patent
Tsunogae et al.

(10) Patent No.: US 10,435,497 B2
(45) Date of Patent: Oct. 8, 2019

(54) CYCLOPENTENE RING-OPENING COPOLYMER, METHOD FOR PRODUCING SAME, AND RUBBER COMPOSITION

(71) Applicant: ZEON CORPORATION, Tokyo (JP)

(72) Inventors: Yasuo Tsunogae, Tokyo (JP); Takeshi Sugimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 39 days.

(21) Appl. No.: 14/770,225

(22) PCT Filed: Feb. 26, 2014

(86) PCT No.: PCT/JP2014/054732
§ 371 (c)(1),
(2) Date: Aug. 25, 2015

(87) PCT Pub. No.: WO2014/133028
PCT Pub. Date: Sep. 4, 2014

(65) Prior Publication Data
US 2016/0002382 A1 Jan. 7, 2016

(30) Foreign Application Priority Data

Feb. 26, 2013 (JP) .................................. 2013-036377
Feb. 26, 2013 (JP) .................................. 2013-036378

(51) Int. Cl.
| | | |
|---|---|---|
| C08G 61/08 | (2006.01) | |
| C08F 230/08 | (2006.01) | |
| C08K 3/04 | (2006.01) | |
| C08K 3/36 | (2006.01) | |
| B60C 1/00 | (2006.01) | |
| C08L 65/00 | (2006.01) | |

(52) U.S. Cl.
CPC .......... *C08F 230/08* (2013.01); *B60C 1/0016* (2013.01); *C08G 61/08* (2013.01); *C08K 3/04* (2013.01); *C08K 3/36* (2013.01); *C08L 65/00* (2013.01)

(58) Field of Classification Search
CPC ..................................................... C08G 61/08
See application file for complete search history.

(56) References Cited

U.S. PATENT DOCUMENTS

| | | | |
|---|---|---|---|
| 3,598,796 A | 8/1971 | Nutzel et al. | |
| 3,778,420 A * | 12/1973 | Brown et al. .......... | C08G 61/08 526/281 |
| 3,790,545 A * | 2/1974 | Minchak ................ | C08G 61/08 526/154 |
| 3,941,757 A | 3/1976 | Wakabayashi et al. | |
| 4,020,254 A | 4/1977 | Ofstead | |
| 4,025,708 A * | 5/1977 | Minchak ................ | C08G 61/08 526/137 |
| 4,239,874 A * | 12/1980 | Ofstead .................. | C08G 61/08 502/117 |
| 2006/0258828 A1* | 11/2006 | Sugawara ............. | C08F 232/08 526/308 |
| 2012/0296035 A1* | 11/2012 | Tsunogae .................. | B60C 1/00 524/576 |

FOREIGN PATENT DOCUMENTS

| | | | | |
|---|---|---|---|---|
| CA | 1074949 A | 4/1980 | | |
| GB | 1358406 A * | 7/1974 | ............. | C08G 61/08 |
| JP | 50-154399 A | 12/1975 | | |
| JP | 52-51500 A | 4/1977 | | |
| JP | 53-024400 A | 3/1978 | | |
| JP | 2002-220440 A | 8/2002 | | |
| JP | 2010-116458 A | 5/2010 | | |
| JP | 2010-155935 A | 7/2010 | | |
| JP | 2011-126966 A | 6/2011 | | |
| WO | 2007/100891 A1 | 9/2007 | | |
| WO | 2008/048536 A3 | 4/2008 | | |
| WO | 2011/087072 A1 | 7/2011 | | |

OTHER PUBLICATIONS

Extended Seach Report dated Aug. 30, 2016, issued in counterpart European Application No. 14757156.6 (9 pages).
International Preliminary Report on Patentability (Forms PCT/IB/373) issued in counterpart International Application No. PCT/JP2014/054732 dated Sep. 1, 2015 with Forms PCT/IB/237. (4 pages).
International Search Report dated Jun. 3, 2104, issued in counterpart Application No. PCT/JP2014/054732 (2 pages).
Gallagher et al., "Metathesis co-polymerization as a means of comparing the reactivity of ruthenium initiators in conventional solvents and ionic liquids", Elsever, Journal of Molecular Catalysis A: Chemical, 303(1-2), 2009, p. 78-83, Cited in ISR.
E.C. Greeg, Jr., "Rubber Chemistry and Technology", The B.F. Goodrich Co., vol. 47, No. 3, 1974, pp. 551-596.

* cited by examiner

*Primary Examiner* — Karuna P Reddy
(74) *Attorney, Agent, or Firm* — Westerman, Hattori, Daniels & Adrian, LLP

(57) ABSTRACT

[Problem] To provide a cyclopentene ring-opening copolymer used in a rubber composition for tires having excellent wet grip performance and low heat buildup; and a method for producing the cyclopentene ring-opening copolymer. To further provide a rubber composition obtained by using the cyclopentene ring-opening copolymer. [Solution] This cyclopentene ring-opening copolymer comprises cyclopentene and a cyclic olefin containing an aromatic ring; the content of the aromatic ring with respect to the total weight of the copolymer is 10 to 40 wt %; and the weight average molecular weight (Mw) is 200,000 to 1,000,000. The cyclopentene ring-opening copolymer alternatively comprises cyclopentene and a norbornene compound; the weight ratio of cyclopentene-derived structural units to all repeating structural units in the copolymer is 40 to 90 wt %, and the weight ratio of norbornene compound-derived structural units is 10 to 60 wt %; and the weight average molecular weight (Mw) is 200,000 to 1,000,000.

7 Claims, No Drawings

… (1)

CYCLOPENTENE RING-OPENING COPOLYMER, METHOD FOR PRODUCING SAME, AND RUBBER COMPOSITION

TECHNICAL FIELD

The present invention relates to a cyclopentene ring-opening copolymer, a production method and a rubber composition thereof, and further specifically the present invention relates to the cyclopentene ring-opening copolymer suitably used for providing the rubber composition having excellent wet-grip property and low heat buildup property, and the production method thereof; and also relates to the rubber composition obtained by using the copolymer thereof.

BACKGROUND ART

In general, the cyclopentene carries out a metathesis ring-opening polymerization under the presence of so called Ziegler-Natta catalyst, which is made of a compound of transition metal belonging to Group 6 of a Periodic Table such as $WCl_6$ or $MoCl_5$ or so, and an organometal activating agent such as triisobutylaluminum, diethylaluminumchloride and tetrabutyltin or so; thereby an unsaturated linear polymer is provided, and it is known to exhibit excellent rubber characteristic and have characteristic as rubber for tires (Non-patent document 1). However, since it is a linear polymer, when used as the rubber for tires, depending on the rubber member constituting the tires, there was a problem that the handling stability declines such as a wet grip property or a dry grip property or so which are essential characteristics required. However, there is no known method to improve this.

On the other hand, the patent document 1 describes to carry out the ring-opening copolymerization of cyclopentene and a norbornene compound using a ruthenium carbene complex, thereby the copolymer having high elastic recovery rate can be obtained. However, if ruthenium carbene complex is used, the molecular weight does not increase, hence the weight average molecular weight (Mw) of the obtained copolymer is less than 100,000, and the molecular weight was too low to be used as the rubber for tires.

Also, recently, in connection with the demand to improve the fuel efficiency of the automobile, a low heat buildup property is demanded for the rubber for tires, and a dispersibility of carbon black or silica as the filler is demanded. As the method for this, the method which introduces the functional group such as amino group or alkoxysilyl group having high affinity with the carbon black or silica as the filler to the polymer terminal is considered. For the cyclopentene ring-opening copolymer, the method of introducing the functional group to the polymer terminal is considered, however the functional group cannot be introduced to the polymer terminal using the conventional Ziegler-Natta catalyst, hence the affinity against the filler was low and the dispersibility was poor. In connection with this problem, recently, the ruthenium carbene complex as the polymerization catalyst was developed, and when it was used as the polymerization catalyst, the functional group can be easily introduced to the polymer terminal of the cyclopentene ring-opening copolymer. Thus, in view of various purposes, the cyclopenete ring-opening copolymer wherein the functional group such as alkoxysilyl group, amino group, epoxy group, ester group, hydroxyl group, carboxyl group or so being introduced to the polymer terminal is synthesized (the patent documents 2 and 3). However, the weight average molecular weight (Mw) of the obtained cyclopentene ring-opening copolymer is less than 100,000, and the molecular weight was too low for the use as the rubber for tires.

Therefore, cyclopentene ring-opening copolymer which exhibits the wet grip property and the dry grip property is demanded when using the cyclopentene ring-opening copolymer as the component of the rubber composition for tires.

PRIOR ART DOCUMENT

Patent document 1: JP Patent Application Laid Open No. 2002-220440
Patent document 2: WO2007/100891
Patent document 3: WO2008/048536
Non-patent document 1: Rubber Chemistry and technology, volume 47, pp 511-596, year 1974

SUMMARY OF THE INVENTION

Technical Problems to be Solved by the Invention

The object of the present invention is to provide the cyclopentene ring-opening copolymer suitably used for the rubber composition for tires having excellent wet grip property and low heat buildup property, and the production method thereof. Also, the object of the present invention is to provide the rubber composition obtained by using said cyclopentene ring-opening copolymer.

Means for Solving the Problems

As a result of the keen examination by the present inventors, it was found that the above object can be attained by cyclopentene ring-opening copolymer including a cyclopentene and a cyclic olefin comprising an aromatic ring, wherein a content of the aromatic ring with respect to an entire amount of said copolymer is 10 to 40 wt %, and a weight average molecular weight (Mw) is 200,000 to 1,000,000; and further preferably by introducing an oxysilyl group to the terminal of the copolymer; thereby the first invention of the present invention was accomplished.

That is, according to the first invention of the present invention, the cyclopentene ring-opening copolymer wherein the content of the aromatic ring with respect to an entire amount of said cyclopentene ring-opening copolymer is 10 to 40 wt %, and a weight average molecular weight (Mw) is 200,000 to 1,000,000 is provided.

Also, as a result of keen examination by the present inventors, it was found that the above object can be attained by cyclopentene ring-opening copolymer including 40 to 90 wt % of a structural unit derived from a cyclopentene and 10 to 60 wt % of a structural unit derived from a norbornene compound, and a weight average molecular weight (Mw) of 200,000 to 1,000,000; and further preferably by introducing an oxysilyl group to the terminal of the copolymer, thereby the second invention of the present invention was accomplished.

That is, according to the second invention of the present invention, the cyclopentene ring-opening copolymer including a structural unit derived from a cyclopentene and a structural unit derived from a norbornene compound, wherein the structural unit derived from a cyclopentene with respect to an entire structural unit of said copolymer is 40 to 90 wt % in terms of weight ratio, a structural unit derived from a norbornene compound with respect to an entire structural unit of said copolymer is 10 to 60 wt % in terms of weight ratio, and a weight average molecular weight (Mw) is 200,000 to 1,000,000 is provided.

Further, according to the first and the second inventions of the present invention, the cyclopentene ring-opening copolymer comprising the oxysilyl group at the terminal of the copolymer chain is provided.

Also, according to the first invention of the present invention, the production method of the above mentioned cyclopentene ring-opening copolymer comprising ring-opening copolymerization of the cyclopentene and the cyclic olefin comprising an aromatic ring under the presence of (A) a compound of transition metal belonging to Group 6 in the Periodic Table, and (B) an organic aluminum compound expressed by below general formula (1) is provided.

$$(R^1)_{3-a-b}Al(OR^2)_aX_b \quad (1)$$

(in the above general formula (1), $R^1$ is a hydrocarbon group having carbon atoms of 1 to 20, $R^2$ is a hydrocarbon group having carbon atoms of 1 to 20 which may comprise halogen atom, and X is halogen atom. "a" is 1 or 2, "b" is 0 or 1, and satisfying a+b<3.)

Also, according to the second invention of the present invention, the production method of the above mentioned cyclopentene ring-opening copolymer comprising ring-opening copolymerization of the cyclopentene and the norbornene compound under the presence of (A) a compound of transition metal belonging to Group 6 in the Periodic Table, and (B) an organic aluminum compound expressed by below general formula (1) is provided.

$$(R^1)_{3-a-b}Al(OR^2)_aX_b \quad (1)$$

(in the above general formula (1), $R^1$ is a hydrocarbon group having carbon atoms of 1 to 20, $R^2$ is a hydrocarbon group having carbon atoms of 1 to 20 which may comprise halogen atom, and X is halogen atom. "a" is 1 or 2, "h" is 0 or 1, and satisfying a+b<3.)

Further, the production method of the cyclopentene ring-opening copolymer which carries out the ring-opening copolymerization under the presence of (C) an oxysilyl group containing olefinic unsaturated hydrocarbon, in addition to (A) and (B) of the production method described in above is provided.

Also, according to the present invention, the rubber composition made by blending the rubber component comprising the above mentioned cyclopentene ring-opening copolymer, and silica and/or carbon black is provided.

Effects of the Present Invention

According to the present invention, the rubber composition for tires having excellent handling stability is provided, and the cyclopentene ring-opening copolymer which can be preferably used for the rubber composition for the tires having excellent low fuel consumption property is provided.

Particularly, according to the first invention of the present invention, the cyclopentene ring-opening copolymer includes a cyclopentene and m a cyclic olefin comprising an aromatic ring, and the content of the aromatic ring against the entire weight of the copolymer and the weight average molecular weight (Mw) of the copolymer are set within the above mentioned range, thereby the rubber composition produced by using said ring-opening copolymer has excellent wet grip property and low heat buildup property. Further, by comprising the oxysilyl group at the terminal of the copolymer chain, the low heat buildup property of the rubber composition can be further enhanced.

Also, according to the second invention of the present invention, the content of the cyclopentene unit and the content of the norbornene compound unit, and the weight average molecular weight (Mw) of the cyclopentene ring-opening copolymer are set within the above mentioned range; thereby the rubber composition produced by using said ring-opening copolymer has excellent wet grip property and low heat buildup property. Further, by comprising the oxysilyl group at the terminal of the copolymer chain, the low thermic property of the rubber composition can be further enhanced.

EMBODIMENTS FOR CARRYING OUT THE INVENTION (The Cyclopentene Ring-opening Copolymer)

The cyclopentene ring-opening copolymer according to the first invention of the present invention has the content of the aromatic ring of 10 to 40 wt % with respect to an entire amount of said copolymer, and a weight average molecular weight (Mw) of 200,000 to 1,000,000.

Here, the content of the aromatic ring is shown by the weight ratio of the aromatic ring included in the polymer, and it is 10 to 40 wt %, preferably 12 to 38 wt %, and more preferably 15 to 35 wt %. By setting the content of the aromatic ring in the copolymer within the above mentioned range, the glass transition temperature (Tg) of said ring-opening copolymer is −45° C. or more and 0° C. or less, preferably −40° C. or more and −5° C. or less, and more preferably −35° C. or more and −10° C. or less; thereby the rubber composition using thereby has excellent wet grip property. Also, the excellent wet grip property of the rubber composition according to the first invention of the present invention is thought to be also caused by the stabilization of the aromatic rings against each other in the copolymer by a mutual influence.

The cyclic olefin comprising the aromatic ring which is used for the copolymer is the cyclic olefin comprising the aromatic ring as the substituent group. As such cyclic olefin, the norbornene compound shown by the chemical formula of the general formula (2), and the monocyclic olefins shown by the general formula (3) or so may be mentioned. Note that, "monocyclic" here refers that the structure as the cyclic olefin is monocyclic, and it does not consider the cyclic structural group (aromatic ring or so) as the substituent group.

[Chemical formula 1]

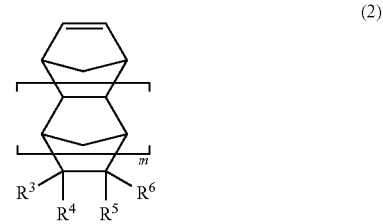

(2)

(In the above formula, $R^3$ to $R^6$ show hydrogen atoms, hydrocarbon atoms having the carbon atoms of 1 to 20 or the substituent group including halogen atoms, silicon atoms, oxygen atoms or nitrogen atoms, $R^4$ and $R^5$ may be bonded to form a ring, but at least one comprises the aromatic ring. "m" is 0 or 1.)

[Chemical formula 2]

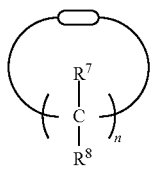

(3)

(In the formula, $R^7$ and $R^8$ show hydrogen atoms, hydrocarbon atoms having the carbon atoms of 1 to 20 or the substituent group including halogen atom, silicon atom, oxygen atom or nitrogen atom; $R^7$ and $R^8$ may be bonded to form a ring, but at least one comprises the aromatic ring. "n" is the integer of 2 to 10, plurality of —C— may form a bond by single bond or double bond. In case of double bond, $R^8$ does not exist.)

As the specific example of the norbornene compound comprising the aromatic ring shown by the general formula (2) used in the present invention, bicycle[2.2.1]hepto-2-enes comprising the aromatic ring as the substituent group, such as 5-phenyl-2-norbornene, 5-naphtyl-2-norbornene, tetracyclo[9.2.1.0$^{2,10}$.0$^{3,8}$]tetradeca-3,5,7,12-tetraene (also called as 1,4-methano-1,4,4a,9a-tetrahydro-9H-fluorene), tetracyclo[10.2.1.0$^{2,11}$.0$^{4,9}$]pentadeca-4,6,8,13-tetraene (also called as 1,4-methano-1,4,4a,9,9a,10-hexahydroanthracene), N-phenyl-5-norbornene-2,3-dicarboxylimide, N-toluyl-5-norbornene-2,3-dicarboxylimide or so;

tetracyclo[6.2.1.1$^{3,6}$.0$^{2,7}$]dodeca-4-enes comprising the aromatic ring as the substituent group, such as 9-phenyltetracyclo[6.2.1.1$^{3,6}$.0$^{2,7}$]dodeca-4-ene, 9-naphtyltetracyclo[6.2.1.1$^{3,6}$.0$^{2,7}$]dodeca-4-ene or so may be mentioned.

Among these, bicyclo[2.2.1]hepto-2-enes comprising the aromatic ring as the substituent group is preferable as the rubber characteristic which is the object of the present invention is excellent, and 5-phenyl-2-norbornene is particularly preferable.

As specific example of the monocyclic olefin comprising the aromatic ring shown by the general formula (3) used in the present invention, phenylcyclooctene, 5-phenyl-1,5-cyclopctadiene, phenylcyclopentene or so may be mentioned, and any of these can be used preferably.

The ring-opening copolymer made of the cyclopentene and the cyclic olefin comprising the above mentioned aromatic ring, comprises the cyclopentene unit and the cyclic olefin unit comprising the aromatic ring. The cyclopentene unit refers to the structural unit formed by polymerizing cyclopentene (the structural unit derived from cyclopentene); and the cyclic olefin unit comprising the aromatic ring refers to the structural unit formed by polymerizing the cyclic olefin comprising the aromatic ring (the structural unit derived from the cyclic olefin comprising the aromatic ring). Here, the ratio of each structural unit in the cyclopentene ring-opening copolymer according to the first invention of the present invention usually matches the ratio of the above mentioned monomer (the monomer ratio) capable of forming each structural unit in the entire monomer used for the polymerization of the ring-opening copolymer.

The ratio of the structural unit derived from the cyclopentene in the cyclopentene ring-opening copolymer (hereinafter it may be referred as "the cyclopentene unit content") is preferably 15 to 85 wt %, more preferably 20 to 80 wt %; and the ratio of the structural unit derived from the cyclic olefin comprising the aromatic ring (hereinafter it may be refers as "the cyclic olefin comprising the aromatic ring unit content") is preferably 15 to 85 wt %, more preferably 20 to 80 wt %. By setting the content ratio of each structural unit within the above range, the content of the aromatic ring with respect to the entire amount of the cyclopentene ring-opening copolymer according to the first invention of the present invention can be easily controlled.

The cyclopentene ring-opening copolymer according to the second invention of the present invention comprises the structural unit derived from the cyclopentene with respect to the entire structural unit of 40 to 90 wt % in terms of the weight ratio; and the structural unit derived from the norbornene compound with respect to the entire structural unit of 10 to 60 wt % in terms of the weight ratio; and the weight average molecular weight (Mw) of 200,000 to 1,000,000.

The structural unit derived from the cyclopentene refers to the structural unit formed by polymerizing the cyclopentene, and the structural unit derived from the norbornene compound refers to the structural unit formed by polymerizing the norbornene compound. Usually, the ratio of each structural unit in the ring opening copolymer matches the ratio of the monomer (monomer ratio) capable of forming each structural unit in the entire monomer used for the polymerization of the ring-opening copolymer; however in the second invention of the present invention, the ratio of each structural unit is measured by the method described in the present examples.

The structural unit derived from the cyclopentene with respect to entire structural unit is 40 to 90 wt %, preferably 45 to 88 wt %, and more preferably 50 to 85 wt %. Also, the structural unit derive from the norbornene compound with respect to entire structural unit is 10 to 60 wt %, preferably 12 to 55 wt %, and more preferably 15 to 50 wt %. When the ratio of the structural unit derived from the cyclopentene and the structural unit derived from the norbornene compound in the copolymer is within the above mentioned range, the glass transition temperature (Tg) of said ring-opening copolymer is −45° C. or more and 0° C. or less, preferably −40° C. or more and −5° C. or less, and more preferably −37° C. or more and −10° C. or less; and the rubber composition obtained by using this has excellent wet grip property.

As the norbornene compound used for the copolymer, any of those can be used as long as it has norbornene ring structure, however the compound shown by the chemical formula of the general formula (11) is preferable.

[Chemical formula 3]

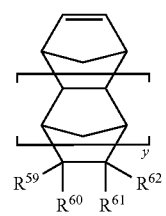

(11)

(In the above formula, $R^{59}$ to $R^{62}$ show hydrogen atoms, hydrocarbon atoms having the carbon atoms of 1 to 20 or the substituent group including halogen atoms, silicon atoms, oxygen atoms or nitrogen atoms, $R^{60}$ and $R^{61}$ may be bonded to form a ring. "y" is 0 or 1.)

As the specific examples of the norbornene compounds used for the second invention of the present invention, the followings can be mentioned. bicyclo[2.2.1]hepto-2-enes with no substitution or comprising hydrocarbon substituent group, such as 2-norbornene, 5-methyl-2-norbornene, 5-ethyl-2-norbornene, 5-butyl-2-norbornene, 5-hexyl-2-norbornene, 5-decyl-2-norbornene, 5-cyclohexyl-2-norbornene, 5-cyclopentyl-2-norbornene, 5-ethylidene-2-norbornene, 5-vinyl-2-norbornene, 5-propenyl-2-norbornene, 5-cyclohexenyl-2-norbornene, 5-cyclopentenyl-2-norbornene, 5-phenyl-2-norbornene, tetracyclo[9.2.1.0$^{2,10}$.0$^{3,8}$]tetradeca-3,5,7,12-tetraene (also called as 1,4-methano-1,4,4a,9a-tetrahydro-9H-fluolene), tetracyclo[10.2.1.0$^{2,11}$.0$^{4,9}$]pentadeca-4,6,8,13-tetraene (also called as 1,4-methano-1,4,4a,9,9a,10-hexahydroanthracene), dicyclopentadiene, methyldicyclopentadiene, and dihydrodicyclopentadiene (also called as tricycle[5.2.1.0$^{2,6}$]deca-8-ene) or so;

tetracyclo[6.2.1.1$^{3,6}$.0$^{2,7}$]dodeca-4-enes with no substitution or comprising hydrocarbon substituent group, such as tetracyclo[6.2.1.1$^{3,6}$.0$^{2,7}$]dodeca-4-ene, 9-methyltetracyclo[6.2.1.1$^{3,6}$.0$^{2,7}$]dodeca-4-ene, 9-ethyltetracyclo[6.2.1.1$^{3,6}$.0$^{2,7}$]dodeca-4-ene, 9-cyclohexyltetracyclo[6.2.1.1$^{3,6}$.0$^{2,7}$]dodeca-4-ene, 9-cyclopentyltetracyclo[6.2.1.1$^{3,6}$.0$^{2,7}$]dodeca-4-ene, 9-methylenetetracyclo[6.2.1.1$^{3,6}$.0$^{2,7}$]dodeca-4-ene, 9-ethylidenetetracyclo[6.2.1.1$^{3,6}$.0$^{2,7}$]dodeca-4-ene, 9-vinyltetracyclo[6.2.1.1$^{3,6}$.0$^{2,7}$]dodeca-4-ene, 9-propenyltetracyclo[6.2.1.1$^{3,6}$.0$^{2,7}$]dodeca-4-ene, 9-cyclohexenyltetracyclo[6.2.1.1$^{3,6}$.0$^{2,7}$]dodeca-4-ene, 9-cyclopentenyltetracyclo[6.2.1.1$^{3,6}$.0$^{2,7}$]dodeca-4-ene and 9-phenyltetracyclo[6.2.1.1$^{3,6}$.0$^{2,7}$]dodeca-4-ene or so;

bicyclo[2.2.1]hepto-2-eves comprising alkoxycarbonyl group such as 5-norbornene-2-methylcarboxylate, 5-norbornene-2-ethylcarboxylate, 2-methyl-5norbornene-methylcarboxylate, 2-methyl-5-norbornene-2-ethylcarboxylate or so;

tetracyclo[6.2.1.1$^{3,6}$.0$^{2,7}$]dodeca-4-eves comprising alkoxycarbonyl group such as tetracyclo[6.2.1.1$^{3,6}$.0$^{2,7}$]dodeca-9-ene-4-methylcarboxylate, and 4-methyltetracyclo[6.2.1.1$^{3,6}$.0$^{2,7}$]dodeca-9-ene-4-methylcarboxylate or so;

bicyclo[2.2.1]hepto-2-enes comprising hydroxycarbonyl group or acid anhydride group, such as 5-norbornene-2-carboxylic acid, 5-norbornene-2,3-dicarboxylic acid and 5-norbornene-2,3-dicarboxylic acid anhydride or so;

tetracyclo[6.2.1.1$^{3,6}$.0$^{2,7}$]dodeca-4-ones comprising hydroxycarbonyl group or acid anhydride group, such as tetracylo[6.2.1.1$^{3,6}$.0$^{2,7}$]dodeca-9-ene-4-carboxylic acid, tetracyclo[6.2.1.1$^{3,6}$.0$^{2,7}$]dodeca-9-ene-4,5-dicarboxylix acid and tetracyclo[6.2.1.1$^{3,6}$.0$^{2,7}$]dodeca-9-ene-4,5-dicarboxylic acid anhydride or so;

bicyclo[2.2.1]hepto-2-enes comprising hydroxyl group, such as 5-hydroxy-2-norbornene, 5-hydroxymethyl-2-norbornene, 5,6-di(hydroxymethyl)-2-norbornene, 5,5-di(hydroxymethyl)-2-norbornene, 5-(2-hydroxyethoxycarbonyl)-2-norbornene and 5-methyl-5-(2-hydroxyethoxycarbonyl)-2-norbornene or so;

tetracyclo[6.2.1.1$^{3,6}$.0$^{2,7}$]dodeca-4-encs comprising hydroxyl group, such as tetra[6.2.1.1$^{3,6}$.0$^{2,7}$]dodeca-9-ene-4-methanol and tetracyclo[6.2.1.1$^{3,6}$.0$^{2,7}$]dodeca-9-ene-4-ol or so;

bicyclo[2.2.1]hepto-2-enes comprising hydrocarbonyl group such as 5-norbomene-2-carbaldehyde or so;

tetracyclo[6.2.1.1$^{3,6}$.0$^{2,7}$]dodeca-4-enes comprising hydrocarbonyl group such as tetracyclo[6.2.1.1$^{3,6}$.0$^{2,7}$]dodeca-9-ene-4-carbaldehyde or so;

bicyclo[2.2.1]hepto-2-enes comprising alkoxycarbonyl group and hydroxycarbonyl group, such as 3-methoxycarbonyl-5-norbornene-2carboxylic acid or so;

bicyclo[2.2.1]hepto-2-enes comprising carbonyloxy group, such as acetic acid 5-norbornene-2-yl, acetic acid 2-methyl-5-norbornene-2-yl, acrylic acid 5-norbornene-2-yl and methacrylic acid 5-norbornene-2-yl or so;

tetracyclo[6.2.1.1$^{3,6}$.0$^{2,7}$]dodeca-4-ones comprising carbonyloxy group, such as acetic acid 9-tetracyclo[6.2.1.1$^{3,6}$.0$^{2,7}$]dodeca-4-enyl, acetic acid 9-tetracyclo[6.2.1.1$^{3,6}$.0$^{2,7}$]dodeca-4-enyl, acrylic acid 9-tetracyclo[6.2.1.1$^{3,6}$.0$^{2,7}$]dodeca-4-enyl and methacrylic acid 9-tetracyclo[6.2.1.1$^{3,6}$.0$^{2,7}$]dodeca-4-enyl or so;

bicyclo[2.2.1]hepto-2-ones comprising the functional group including the nitrogen atoms such as 5-norbornene-2-carbonitrile and 5-norbornene-2-carboxamide, 5-norbornene-2,3-dicarboxylic acid imide or so;

tetracyclo[6.2.1.1$^{3,6}$.0$^{2,7}$]dodeca-4-enes comprising the functional group including the nitrogen atoms such as tetracyclo[6.2.1.1$^{3,6}$.0$^{2,7}$]dodeca-9-ene-4-carbonitrile, tetracyclo[6.2.1.1$^{3,6}$.0$^{2,7}$]dodeca-9-ene-4-carboxamide and tetracyclo[6.2.1.1$^{3,6}$.0$^{2,7}$]dodeca-9-ene-4-,5-dicarboxylic acid imide or so;

bicyclo[2.2.1]hepto-2-enes comprising the halogen atoms such as 5-chloro-2-norbornene or so;

tetracyclo[6.2.1.1$^{3,6}$.0$^{2,7}$]dodeca-4-enes comprising the halogen atoms such as 9-chlorotetracyclo[6.2.1.1$^{3,6}$.0$^{2,7}$]dodeca-4-ene or so;

bicyclo[2.2.1]hepto-2-enes comprising the functional group including the silicon atoms such as 5-trimethoxy-2-norbornene, 5-triethoxy-2-norbornene or so;

tetracyclo[6.2.1.1$^{3,6}$.0$^{2,7}$]dodeca-4-enes comprising the functional group including the silicon atoms such as 4-trimethoxysilyltetracyclo[6.2.1.1$^{3,6}$.0$^{2,7}$]dodeca-9-ene, 4-triethoxysilyltetracyclo[6.2.1.1$^{3,6}$.0$^{2,7}$]dodeca-9-ene or so may be mentioned.

Among these, bicyclo[2.2.1]hepto-2-enes without substitution or comprising the hydrocarbon group, and tetracyclo[6.2.1.1$^{3,6}$.0$^{2,7}$]dodeca-4-enes without substitution or comprising the hydrocarbon group are preferable since the characteristic as the rubber when the composition ratio of cyclopentene/norbornene compound is set to that of the object of the present invention is excellent; and 2-norbornene, 5-methyl-2-norbornene, 5-ethyl-2-norbornene, 5-ethylidene-2-norbornene, 5-vinyl-2-norbornene, 5-phenyl-2-norbornene, dicyclopentadiene, methyldicyclopentadiene, tetracyclo[6.2.1.1$^{3,6}$.0$^{2,7}$]dodeca-4-ene, 9-methyltetracyclo[6.2.1.1$^{3,6}$.0$^{2,7}$]dodeca-4-ene, 1,4-methano-1,4,4a,9a-tetrahydro-9H-fluorene or so are more preferable.

The cyclopentene ring-opening copolymer according to the first and the second invention of the present invention has the weight average molecular weight (Mw) of 200,000 to 1,000,000, preferably 250,000 to 900,000, more preferably 280,000 to 880,000, and particularly preferably 300,000 to 850,000. If the molecular weight is too low, the rubber characteristic deteriorates; hence it is not preferable. On the other hand, if the molecular weight is too large, the production and the handling become difficult. Note that, the weight average molecular weight (Mw) of the cyclopentene ring-opening copolymer according to the first and the second invention of the present invention can be appropriately regulated within the above mentioned range depending on the purpose of the use.

The cyclopentene ring-opening copolymer according to the first and the second invention of the present invention preferably comprises the oxysilyl group at the terminal of the copolymer chain. The oxysilyl group is the group comprising the silicon-oxygen bonding, and comprises the chemical structure shown by —Si—O—. In the first invention of the present invention, while the cyclopentene unit content, the cyclic olefin unit content comprising the aromatic ring and the weight average molecular weight (Mw) are set within the above range, and by introducing the oxysilyl group at the terminal of the copolymer chain; also in the second invention of the present invention, while the cyclopentene unit content, the norbornene compound unit content, and the weight average molecular weight (Mw) are set within the above range, and by introducing the oxysilyl group at the terminal of the copolymer chain; the affinity of the filler such as silica or carbon black which is blended in the rubber composition obtained using the copolymer is improved, and the dispersibility of the filler becomes excellent; hence the rubber composition having excellent wet grip property and low heat buildup property can be obtained. Note that, the norbornene compound unit content refers to the ratio of the structural unit derived from the norbornene compound (with respect to entire structural unit in said copolymer) in the cyclopentene ring-opening copolymer.

Among the oxysilyl group, for example, an alkoxysilyl group, an aryloxysilyl group, an acyloxysilyl group, an alkylsiloxysilyl group and an arylsiloxysilyl group are preferable from the point that the affinity between the silica or carbon black as the filler which is used as the rubber material of tires is high, and the effect to improve the low heat buildup property is high. Also, the hydroxysilyl group made by hydrolyzing the alkoxysilyl group or aryloxysilyl group, acyloxysilyl group is preferable.

The alkoxysilyl group is the group wherein one or more alkoxy groups are bonded with the silicon atom; and as specific examples trimethoxysilyl group, (dimethoxy)(methyl)silyl group, (methoxy)(dimethyl)silyl group, (methoxy)(dichloro)silyl group, triethoxysilyl group, (diethoxy)(methyl)silyl group, (ethoxy)(dimethyl)silyl group, (dimethoxy)(ethoxy)silyl group, (methoxy)(diethoxy)silyl group, tripropoxysilyl group or so may be mentioned.

Aryloxysilyl group is the group wherein one or more of aryloxysilyl groups are bonded with the silicon atom; and as specific examples triphenoxysilyl group, (diphenoxy)(methyl)silyl group, (phenoxy)(dimethyl)silyl group, (phenoxy)(dichloro)silyl group, (diphenoxy)(ethoxy)silyl group, (phenoxy)(diethoxy)silyl group or so may be mentioned. Note that, among these, (diphenoxy)(ethoxy)silyl group, (phenoxy)(diethoxy)silyl group are also grouped into alkoxysilyl group since those comprises the alkoxy group in addition to the aryloxy group.

The acyloxysilyl group is the group wherein one or more acyloxy groups are bonded with the silicon atom; and as the specific examples, triacyloxysilyl group, (diacyloxy)(methyl)silyl group, acyloxy(dimethyl)silyl group, (acyloxy)(dichloro)silyl group or so may be mentioned.

The alkylsiloxysilyl group is the group wherein one or more alkylsiloxy groups are bonded with the silicon atom; and as the specific examples, tris(trimethylsiloxy)silyl group, trimethylsiloxy(dimethyl)silyl group, triethylsiloxy(diethyl)silyl group, and tris(dimethylsiloxy)silyl group or so may be mentioned.

The arylsiloxysilyl group is the group wherein one or more of arylsiloxy groups are bonded to the silicon atom; and as the specific examples, tris(triphenylsiloxy)silyl group, triphenylsiloxy(dimethyl)silyl group, and tris(diphenylsiloxy)silyl group or so may be mentioned.

The hydroxysilyl group is the group wherein one or more hydroxy groups are bonded to the silicon atom; and as a specific examples, trihydroxysilyl group, (dihydroxy)(methyl)silyl group, (hydroxy)(dimethyl)silyl group, (hydroxy)(dichloro)silyl group, (dihydroxy)(ethoxy)silyl group, and (hydroxy)(diethoxy)silyl group or so may be mentioned. Note that, among these, (dihydroxy)(ethoxy)silyl group and (hydroxy)(diethoxy)silyl group are also grouped as the alkoxy silyl group since these comprise the alkoxy group in addition to the hydroxy group.

Also, as the oxysilyl group, besides the above mentioned, the polysiloxane group of a linear form which is expressed by below general formula (4), or the polysiloxane group of ring form expressed by below general formula (5) are also preferable.

[Chemical formula 4]

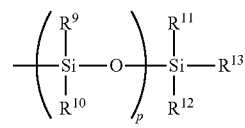

(4)

(In the above general formula (4), $R^9$ to $R^{13}$ are the group selected from hydrogen atom, alkyl group having the carbon atoms of 1 to 10, aryl group, alkoxy group, aryloxy group, acyloxy group, alkylsiloxy group, and arylsiloxy group. Also, "p" is integer of 1 to 10.)

[Chemical formula 5]

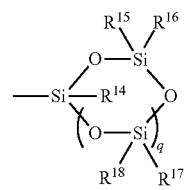

(5)

(In the above general formula (5), $R^{14}$ to $R^{18}$ are the group selected from hydrogen atom, alkyl group having the carbon atoms of 1 to 10, aryl group, alkoxy group, aryloxy group, acyloxy group, alkylsiloxy group, and arylsiloxy group. Also, "q" is integer of 1 to 10.)

Note that, in the above mentioned general formulas (4) and (5), from the point that the polymerization activity can be increased when obtaining the cyclopentene ring-opening copolymer, $R^9$ to $R^{13}$ and $R^{14}$ to $R^{18}$ are preferably hydrogen atom or alkyl group having carbon atoms of 1 to 6 such as methyl group, ethyl group, propyl group, cyclohexyl group or so.

The introduction ratio of the oxysilyl group in the terminal of the copolymer chain of the cyclopentene ring-opening copolymer according to the first and the second invention of the present invention is not particularly limited, and it is preferably 10% or more, more preferably 20% or more, further preferably 30% or more, and particularly preferably 40% or more. The higher the introduction ratio of the oxysilyl group is, the higher the affinity with the silica or the carbon black as the filler used for the rubber material for tires is; thereby the effect to improve the low heat buildup property can be enhanced, hence it is preferable. Note that, as the method for measuring the introduction ratio of the oxysilyl group to the termainl of the copolymer, it is not particularly limited, and for example, it can obtained from the peak surface ratio corresponding to the oxysilyl group obtained from $^1$H-NMR spectrometry, and from the number average molecular weight obtained from gel-permeation chromatography.

Also, the cyclopentene ring-opening copolymer according to the first invention of the present invention may comprise the structural unit derived from the cyclic olefin having metathesis reactivity, besides the cyclopentene and the cyclic olefin comprising the aromatic ring, as long as the property as the rubber for the tires is maintained. As such cyclic olefin, monocyclic olefin such as cyclooctene, 1,5-cyclooctadiene, 1,5,9-cyclododecatriene or so, or a norbornene compound such as 2-norbornene and dicyclopentadiene or so may be mentioned. Other than cyclopentene and the cyclic olefin comprising the aromatic ring, the content of the structural unit derived from the cyclic olefin having metathesis reactivity is preferably less than 10 wt %, more preferably 5 wt % or less, and further preferably 3 wt % or less.

Also, the cyclopentene ring-opening copolymer according to the second invention of the present invention may comprise the structural unit derived from the cyclic olefin having metathesis reactivity, besides the cyclopentene and the norbornene compound, as long as the property as the rubber for the tires is maintained. As such cyclic olefin, the same monocyclic olefin mentioned in the above may be mentioned. Other than cyclopentene and the norbornene compound, the content of the structural unit derived from the cyclic olefin having metathesis reactivity is preferably less than 10 wt %, more preferably 5 wt % or less, and further preferably 3 wt % or less.

The Mooney viscosity ($ML_{1+4}$, 100° C.) of the cyclopentene ring-opening copolymer according to the first and the second invention of the present invention is preferably 20 to 150, more preferably 22 to 120, and further preferably 25 to 100.

The cyclopentene ring-opening copolymer according to the first invention of the present invention has the content of the aromatic ring and the weight average molecular weight (Mw) which are within the above mentioned range, and since in some case it comprises the oxysilyl group at the terminal of the copolymer chain, the Mooney viscosity is controlled within the above range, thereby excellent processability is exhibited. Also, the cyclopentene ring-opening copolymer according to the second invention of the present invention has of the cyclopentene unit content of and the norbornene compound unit content and the weight average molecular weight (Mw) which are within the above mentioned range, and since in some case it comprises the oxysilyl group at the terminal of the copolymer chain, the Mooney viscosity is controlled within the above range, thereby excellent processability is exhibited. If the Mooney viscosity is too low, the kneading at high temperature becomes difficult, and the processability may be deteriorated. On the other hand, if the Mooney viscosity is too high, the kneading becomes difficult, and similarly the processability may be deteriorated.

(The Production Method of the Cyclopentene Ring-opening Copolymer)

The cyclopentene ring-opening copolymer according to the first invention of the present invention is produced by ring-opening copolymerization of the cyclopentene and the cyclic olefin comprising the aromatic ring, under the presence of the compound (A) of transition metal belonging to Group 6 in the Periodic Table, and the organic aluminum compound (B) expressed by below general formula (1).

$$(R^1)_{3-a-b}Al(OR^2)_a X_b \quad (1)$$

(in the above general formula (1), $R^1$ is a hydrocarbon group having carbon atoms of 1 to 20, $R^2$ is a hydrocarbon group having carbon atoms of 1 to 20 which may comprise halogen atom, and X is halogen atom. "a" is 1 or 2, "b" is 0 or 1, and satisfying a+b<3.)

Also, the cyclopentene ring-opening copolymer according to the second invention of the present invention is produced by the ring-opening copolymerization of the cyclopentene and the norbornene compound under the presence of the compound (A) of transition metal belonging to Group 6 in the Periodic Table, and the organic aluminum compound (B) expressed by below general formula (1).

$$(R^1)_{3-a-b}Al(OR^2)_a X_b \quad (1)$$

(in the above general formula (1), $R^1$ is a hydrocarbon group having carbon atoms of 1 to 20, $R^2$ is a hydrocarbon group having carbon atoms of 1 to 20 which may comprise halogen atom, and X is halogen atom. "a" is 1 or 2, "b" is 0 or 1, and satisfying a+b<3.)

(The Compound (A) of Transition Metal Belonging to Group 6 in the Periodic Table)

The compound (A) of the transition metal belonging to Group 6 in the Periodic Table used in the present invention is the compound comprising the transition metal atom belonging to Group 6 of the Periodic Table (the long-period periodic table, same applies hereinbelow); and specifically the compound comprising a chromium atom, a molybdenum atom or a tungsten atom; and among these the compound comprising the molybdenum atom or the compound comprising the tungsten atom is preferable since the high polymerization activity can be obtained. The compound (A) of the transition metal belonging to Group 6 of the Periodic Table functions as the polymerization catalyst together with the organic aluminum compound (B) which will be described in below. As for the compound (A) of the transition metal belonging to Group 6 in the Periodic Table, it is not particularly limited as long as it is a compound comprising the transition metal atom belonging to Group 6 in the Periodic Table; however halogen compound of the transition metal atom of Group 6 of Periodic Table, alcoholate, arylate, oxy comound and imide compound or so may be mentioned, and among these from the point that the polymerization activity is high, halogen compound, oxy compound and imide compound are preferable.

As specific examples of the compound (A) of the transition metal belonging to Group 6 of the Periodic Table, molybdenum compounds such as molybdenum pentachloride, molybdenum oxotetrachloride, molybdenum (phenylimide)tetrachloride, tridodecylanmoniummolybdate, methyltrioctylammoniummolybdate, tridecylammoniummolybdate, trioctylammoniummolybdate, tetraphenylammoniummolybdate or so; tungsten compounds such as tungsten hexachloride, tungsten oxotetrachloride, tungsten (phenylimide)tetrachloride, monocatecholato tungsten tetrachloride, bis(3,5-ditertiarybutyl)catecholato tungsten dichloride, bis(2-chloroethelate)tetrachloride, tungsten oxotetraphenolate or so may be mentioned.

In the first invention of the present invention, the used amount of the compound (A) of the transition metal belonging to Group 6 of the Periodic Table is usually 1:100 to 1:200,000, preferably 1: 200 to 1:150,000, more preferably 1:500 to 1:100,000 in terms of the mol ratio of "the transition metal atom belonging to Group 6 of the Periodic Table: (cyclopentene+the cyclic olefin comprising the aromatic ring)".

Also, in the second invention of the present invention, the used amount of the compound (A) of the transition metal belonging to Group 6 in the Periodic Table is usually 1:100 to 1:200,000, preferably 1:200 to 1:150,000, more preferably 1:500 to 1:100,000 in terms of the mol ratio of "the transition metal atom belonging to Group 6 of the Periodic Table: (cyclopentene+the norbornene compound)".

If the used amount of the compound (A) of the transition metal belonging to Group 6 of the Periodic Table is too little, the polymerization reaction may not proceed sufficiently. On the other hand, if it is too much, the removal of the catalyst residue from the obtained cyclopentene ring-opening copolymer becomes difficult, and in some case the heat resistance or the cold resistance of the obtained cyclopentene ring-opening copolymer declines.

(The Organic Aluminum Compound (B))

The organic aluminum compound (B) used in the present invention is the compound shown by the below general formula (1). The organic aluminum compound (B) functions as the polymerization catalyst together with the above mentioned compound (A) of the transition metal belonging to Group 6 of the Periodic Table.

$$(R^1)_{3-a-b}Al(OR^2)_aX_b \qquad (1)$$

In the above general formula (1), $R^1$ is hydrocarbon group having carbon atoms of 1 to 20, and more preferably hydrocarbon group comprising carbon atoms of 1 to 10.

As specific examples of $R^1$, alkyl groups such as methyl group, ethyl group, isopropyl group, n-propyl group, isobutyl group, n-butyl group, t-butyl group, n-hexyl group, cyclohexyl group, n-octyl group, n-decyl group or so; aryl groups such as phenyl group, 4-methylphenyl group, 2,6-dimethylphenyl group, 2,6-diisopropylphenyl group, naphtyl group or so may be mentioned.

In the above general formula (1), $R^2$ is hydrocarbon group having carbon atoms of 1 to 20 and which may comprise halogen atoms, and from the point of the catalyst activation, it is preferably hydrocarbon group having carbon atoms of 1 to 10 which may comprise the halogen atom, and more preferably it is a hydrocarbon group having the carbon atoms of 1 to 10 which comprises the halogen atom. As the halogen atoms, fluorine atom, chlorine atom, bromine atom and iodine atom or so may be mentioned, and as hydrocarbon group having the carbon atoms of 1 to 20, those as same as mentioned in the examples for said $R^1$ may be mentioned.

As the alkyl group having the carbon atoms of 1 to 10 comprising the halogen atom, 1,3-dichloro-2-propyl group, 1,3-dibromo-2-propyl group, 1-chloro-2-butyl group, 2,2,2-trichloroethyl group, 2,2,2-tribromoethyl group, 2,2,2-trifluoroethyl group, 2-trichloromethyl-2-propyl group, tribromomethyl-1-ethyl group, 1,1,1,3,3,3-hexafluoro-2-propyl group or so may be mentioned.

Also, "X" is halogen atom, and those as same as mentioned in the examples for said $R^2$ may be mentioned.

In the above mentioned formula (1), "a" is 1 or 2, and preferably it is 1. "b" is 0 or 1, and satisfies a+b<3. Note that, in case the compound has different values for "a" and "b", and should such compounds is to be expressed by the chemical formula, then "a" and "b" may not be integer but it may be decimal numbers.

As the specific examples of the organic aluminum compound (B), as the example of "a"=1 or 2, "b"=0, diethylaluminumethoxide, diethylaluminumisopropoxide, diisobutylaluminumbutoxide, diethylaluminum (2-trichloroethoxide), diethylaluminum (2-tribruromoethoxide), diethylaluminum (1,3-dichloro-2-propoxide), diethylaluminum (1,1,1,3,3,3-hexafluoro-2-propoxide), diethylaluminum(1,1,1 -trichloro-2-methyl-2-propoxide), diethylaluminum (2,6-diisopropylphenoxide), ethylaluminumdi(2-trichloroethoxide), ethylaluminumdi(2-tribromoethoxide), ethylaluminumdi(1,3-dichloro-2-propoxide), ethylaluminumdi(1,1,3,3,3 -hexafluoro-2-propoxide), ethylaluminumdi(1,1,1-trichloro-2-methyl-2propoxide), ethylaluminumbis(2,6-diisopropylphenoxide) or so may be mentioned.

As example of "a"=1 and "b"=1, ethyl(chloro)aluminumethoxide, ethyl(chloro)aluminumisopropoxide, ethyl(chloro)aluminumbutoxide, ethyl(chloro)aluminum(2-trichloroethoxide), ethyl(chloro)aluminum(2-tribromoethoxide), ethyl(bromo)aluminum(1,3-di chloro-2-propoxide), ethyl(chloro)aluminum(1,1,1,3,3,3-hexafluoro-2-propoxide), ethyl(chloro)aluminum(1,1,1-trichloro-2-methyl-2propoxide), ethyl(chloro)aluminum(2,6-diisopropylphenoxide) or so may be mentioned.

Such organic aluminum compound (B) expressed by the above general formula (1), for example can be synthesized by the reaction of alcohol and trialkylaluminum or alkylaluminum halide, as shown in the below general formula (6).

$$(R^1)_{3-b}AlX_b + aR^2OH \rightarrow (R^1)_{3-a-b}Al(OR^2)_aX_b + aR^1H \qquad (6)$$

Note that, "a" and "b" in the above general formula (1), can be controlled by defining the reaction ratio of corresponding trialkylaluminum or alkylaluminum halide, and the alcohol.

The used amount of the organic aluminum compound (B) differs depending on the type of the used organic aluminum compound (B), however preferably it is 0.1 to 100 times mol, more preferably 0.2 to 50 times mol, and further preferably 0.5 to 20 times mol with respect to the transition metal atom belonging to Group 6 of the Periodic Table composing the compound (A) of the transition metal belonging to Group 6 of the Periodic Table. If the used amount of the organic aluminum compound (B) is too little, the polymerization activity may be insufficient in some case, and if it is too much, the side reaction tends to easily occur during the ring-opening polymerization.

(The Oxysilyl Group Containing Olefinic Unsaturated Hydrocarbon (C))

The oxysilyl group containing olefinic unsaturated hydrocarbon (C) used in the present invention if neded is the compound comprising the oxysilyl group, and one or more olefinic carbon-carbon double bond having metathesis reactivity. By using oxysilyl group containing olefinic unsaturated hydrocarbon (C), the oxysilyl group can be introduced at the terminal of the copolymer chain of the cyclopentene ring-opening copolymer.

As such oxysilyl group containing olefinic unsaturated hydrocarbon (C), for example the compound shown by the below general formulas (7) to (10) may be mentioned.

[Chemical formula 6]

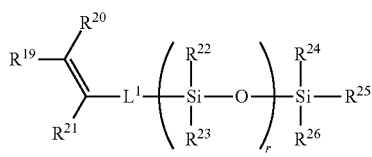

(7)

(In the above general formula (7), $R^{19}$ to $R^{20}$ are hydrogen atom or hydrocarbon groups having carbon atoms of 1 to 10; and $R^{22}$ to $R^{26}$ are the group selected from hydrogen atom, alkyl group having carbon atoms of 1 to 10, aryl group alkoxy group, aryloxy group, acyloxy group, alkylsiloxy group, and arylsiloxy group. Also, $L^1$ is the group which bonds oxysilyl group and olefinic carbon-carbon double bond; and "r" is the integer of 0 to 10. Note that, when "r"=0, at least one of $R^{24}$ to $R^{26}$ is selected from alkoxy group, aryloxy group, acyloxy group, alkylsiloxy group and arylsiloxy group.)

[Chemical formula 7]

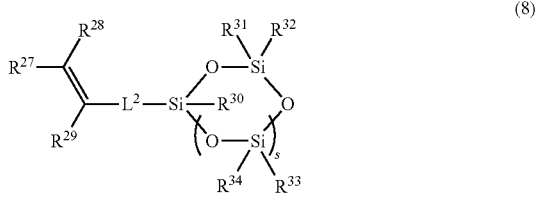

(8)

(In the general formula (8), $R^{27}$ to $R^{29}$ are hydrogen atom or hydrocarbon groups having the carbon atoms of 1 to 10; and $R^{30}$ to $R^{34}$ are the group selected from hydrogen atom, alkyl group having the carbon atoms of 1 to 10, aryl group, alkoxy group, aryloxy group, acyloxy group, alkylsiloxy group, and arylsiloxy group. Also, $L^2$ is the group which bonds oxysilyl group and olefinic carbon-carbon double bond; and "s" is the integer of 1 to 10.)

[Chemical formula 8]

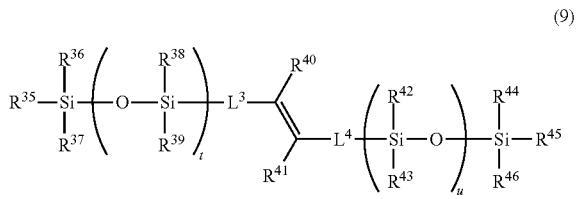

(9)

(In the above general formula (9), $R^{40}$ and $R^{41}$ are hydrogen atom or hydrocarbon groups having carbon atoms of 1 to 10; and $R^{35}$ to $R^{39}$ and $R^{42}$ to $R^{46}$ are the group selected from hydrogen atom, alkyl group having carbon atoms of 1 to 10, aryl group, alkoxy group, aryloxy group, acyloxy group, alkylsiloxy group, and arylsiloxy group. Also, $L^3$ and $L^4$ are the group which bonds oxysilyl group and olefinic carbon-carbon double bond; and "t" and "u" are the integer of 0 to 10. Note that, when "t"=0, at least one of $R^{35}$ to $R^{37}$ is selected from alkoxy group, aryloxy group, acyloxy group, alkylsiloxy group, and arylsiloxy group; and when "u"=0, at least one of $R^{44}$ to $R^{46}$ is selected from alkoxy group, aryloxy group, acyloxy group, alkylsiloxy group, and arylsiloxy group.)

[Chemical formula 9]

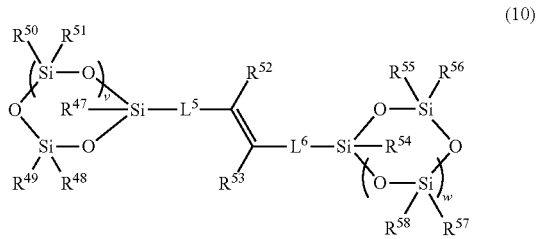

(10)

(In the general formula (10), $R^{52}$ and $R^{53}$ are hydrogen atom or hydrocarbon groups having carbon atoms of 1 to 10; and $R^{47}$ to $R^{51}$ and $R^{54}$ to $R^{58}$ are the group selected from hydrogen atom, alkyl group having carbon atoms of 1 to 10, aryl group, alkoxy group, aryloxy group, acyloxy group, alkylsiloxy group and arylsiloxy group. Also, $L^5$ and $L^6$ are the group which bonds oxysilyl group and olefinic carbon-carbon double bond; and "v" and "w" is the integer of 1 to 10.)

In the general formulas (7) to (10), $R^{19}$ to $R^{21}$, $R^{27}$ to $R^{29}$, $R^{40}$, $R^{41}$, $R^{52}$ and $R^{53}$ are preferably hydrogen atom; and by making these as the hydrogen atom, excellent oxysilyl group containing olefinic unsaturated hydrocarbon (C) can obtained by the metathesis reaction.

Also, in the general formulas (7) to (10), $L^1$ to $L^6$ are not particularly limited, as long as these are group capable of bonding the oxysilyl group and the olefinic carbon-carbon double bond; but preferably it is hydrocarbon group, ether group or tertiary amino group, and more preferably these are aliphatic hydrocarbon groups having carbon atoms of 1 to 20 and aromatic hydrocarbon group having carbon atoms of 6 to 20, from the point that excellent oxysilyl group containing olefinic unsaturated hydrocarbon (C) can obtained by the metathesis reaction. Also, oxysilyl group and the olefinic carbon-carbon double bond may have a constitution which can directly bond without having these groups in between.

Note that, among the compound shown by the above general formulas (7) to (10), in case the compound shown by the general formulas (7) and (8) are used, by the metathesis reaction thereof, the oxysilyl group can be introduced to at least one terminal of the cyclopentene ring-opening polymer. Also, when the compound shown by the general formulas (9) and (10) are used, by the metathesis reaction thereof, the oxysilyl group can be introduced to at both terminals of the cyclopentene ring-opening polymer.

As the preferable examples of the compound of the above general formulas (7) and (8), alkoxysilane compounds such as vinyl(trimethoxy)silane, vinyl(triethoxy)silane, allyl (trimethoxy)silane, allyl(methoxy)(dimethyl)silane, allyl (triethoxy)silane, allyl(ethoxy)(dimethyl)silane, styryl (trimethoxy)silane, styryl(triethoxy)silane, styrylethyl (triethoxy)silane, allyl(triethoxysilylmethyl)ether, allyl (triethoxysilylmethyl)(ethyl)amine or so; acyloxysilane compound such as vinyl(triphenoxy)silane, allyl(phenoxy) (dimethyl)silane or so; acyloxysilane compounds such as vinyl(triacetoxy)silane, allyl(triacetoxy)silane, allyl(diacetoxy)methylsilane, allyl(triphenoxy)silane, allyl(acetoxy) (dimethyl)silane or so; alkylsiloxysilane compounds such as allyltris(trimethylsiloxy)silane or so; arylsiloxysilane compounds such as allyl(trisphenylsiloxy)silane or so; polysiloxane compounds such as 1-allylheptamethyltrisiloxane, 1-allylnonamethyltetrasiloxane, 1-allylnonamethylcyclopentasiloxane, 1-allylundecamethylcyclohexasiloxane or so may be mentioned.

As the preferable examples of the compound of the above general formulas (9) and (10), alkoxysilane compounds such as 2-butene-1,4-di(trimethoxysilane), 2-butene-1,4-di(triethoxysilane), 1,4-di(trimethoxysilylmethoxy)-2-butene or so; arloxysilane compounds such as 2-butene-1,4-di(triphenoxysilane) or so; acyloxysilane compounds such as 2-butene-1,4-di(triacetoxysilane) or so; alkylsiloxysilane compounds such as 2-butene-1,4-di[tris(trimethylsiloxy)silane] or so; arylsiloxysilane compounds such as 2-butene-1,4-di[tris(triphenylsiloxy)silane] or so; polysiloxane compounds such as 2-butene-1,4-ditheptamethyltrisiloxane), 2-butene-1,4-di(undecamethylcyclohexasiloxane) or so may be mentioned.

The used amount of the oxysilyl group containing olefinic unsaturated hydrocarbon (C) may he appropriately selected depending on the molecular weight of the cyclopentene copolymer produced. The used amount of oxysilyl group containing olefinic unsaturated hydrocarbon (C) in the cyclopentene ring-opening copolymer according to the first invention of the present invention is usually 1/100 to 1/100,000, preferably 1/200 to 1/50,000, and more preferably 1/500 to 1/10,000, in terms of mol ratio with respect to cyclopentene+the cyclic olefin comprising the aromatic ring. The used amount of oxysilyl group containing olefinic unsaturated hydrocarbon (C) in the cyclopentene ring-opening copolymer according to the second invention of the present invention is usually 1/100 to 1/100,000, preferably 1/200 to 1/50,000, and more preferably 1/500 to 1/10,000, in terms of mol ratio with respect to cyclopentene+the norbornene compound. Note that, the oxysilyl group containing olefinic unsaturated hydrocarbon (C) also functions as the molecular weight regulator, in addition to the function to introduce the oxysilyl group to the terminal of the copolymer chain of the cylcopentene ring-opening copolymer. If the used amount of the oxysilyl group containing olefinic unsaturated hydrocarbon (C) is too little, the introduction rate of the oxysilyl group to the cycolpentene ring-opening copolymer may become low, and if it is too much, the weight average molecular weight of the cyclopentene ring-opening copolymer may become too low.

Also, in the present invention, as the polymerization catalyst, the oxygen atom containing hydrocarbon compound may be further used. By further using the oxygen atom containing hydrocarbon compound, the polymerization activity can be further improved, and the molecular weight of the obtained cyclopentene ring-opening copolymer can be improved. As the oxygen atom containing hydrocarbon compound, it is not particularly limited as long as it is a hydrocarbon compound comprising the oxygen atom; and preferably it may be ester, ketone or ether compound having the carbon atoms of 2 to 30 which may comprise halogen atom as the substituent group. From the point of improving the polymerization activity at room temperature or higher, and from the point of having enhanced effect to obtain higher molecular weight, ester, ketone or ether compound having carbon atoms of 4 to 10 are preferable. Note that, as such ester, ketone or ether compound, it may be ester, ketone or ether of cyclic form, and further, it may a compound which comprises plurality of ester bonds, ketone bonds or ether bonds in one molecule.

As the specific examples of ester compounds, ethyl acetate, butyl acetate, amyl acetate, octyl acetate, 2-chloroethyl acetate, methyl acetyl acrylate, ε-caprolactone, dimethyl glutaric acid, σ-hexanolactone, diacetoxyethane or so may be mentioned.

As the specific examples of the ketone compounds, acetone, ethylmethylketone, acetylacetone, acetophenone, cyclohexylphenylketone, 1'-acetonaphtone, methyl 2-acetyl benzoate, 4'-chloroacetophenone, chloroacetone, 1,3-dichloro-2-propanone or so may be mentioned.

As the specific examples of the ether compounds, diethylether, tetrahydrofuran, 1,2-dimethoxyethane, ethylenegylcoldiethylether, 1,4-dioxane or so may be mentioned.

The used amount thereof when using the oxygen atom containing hydrocarbon compound differs depending on the type of the oxygen atom containing hydrocarbon compound used; however preferably it is 0.1 to 10 times mol, more preferably 0.2 to 8 times mol, and further preferably 0.5 to 5 times mol with respect to the transition metal atom belonging to Group 6 of the Periodic Table composing the compound (A) of the transition metal belonging to Group 6 of the Periodic Table. If the used amount of the oxygen atom containing hydrocarbon compound is too little, the effect of adding the oxygen atom containing hydrocarbon compound tends to become difficult to obtain, and on the other hand, if it is too much, the polymerization activity may become insufficient.

(The Ring-opening Copolymerization)

In the production method of the cyclopentene ring-opening copolymer according to the first invention of the present invention, cyclopentene and the cyclic olefin comprising the aromatic ring are brought into contact with the compound (A) of the transition metal belonging to Group 6 of the Periodic Table and the organic aluminum compound (B); thereby the ring-opening copolymerization of cyclopentene/the cyclic olefin comprising the aromatic ring is carried out.

Also, in the production method of the cyclopentene ring-opening copolymer according to the second invention of the present invention, cyclopentene and the norbornene compound are brought into contact with the compound (A) of the transition metal belonging to Group 6 of the Periodic Table and the organic aluminum compound (B); thereby the ring-opening copolymerization of cyclopentene/the norbornene compound is carried out.

The method of contacting these and initiating the ring-opening polymerization is not particularly limited.

In the production method of the cyclopentene ring-opening copolymer according to the first invention, for example the method of initiating the ring-opening copolymerization of cyclopentene/the cyclic olefin comprising the aromatic ring are carried out by adding the compound (A) of the transition metal belonging to Group 6 of the Periodic Table under the presence of the cyclopentene, the cyclic olefin comprising the aromatic ring is the organic aluminum compound (B) may be mentioned. Alternatively, the compound (A) of the transition metal belonging to Group 6 of the Periodic Table and the organic aluminum compound (B) may be mixed in advance, then adding cyclopentene and the cyclic olefin comprising the aromatic ring; thereby the ring-opening copolymerization of cyclopentene/the cyclic olefin comprising the aromatic ring may be carried out.

Also, the oxysilyl group containing olefinic unsaturated hydrocarbon (C) may be mixed with cyclopentene and the cyclic olefin comprising the aromatic ring in advance; or it may be mixed with cyclopentene and the cyclic olefin comprising the aromatic ring when carrying out the ring-opening copolymerization. Further, after carrying out the ring-opening copolymerization of cyclopentene and the cyclic olefin comprising the aromatic ring, the oxysilyl group containing olefinic unsaturated hydrocarbon (C) may be added to the obtained ring-opening copolymer to carry out the metathesis reaction with the obtained ring-opening copolymer.

In the production method of the cyclopentene ring-opening copolymer according the second invention, for example the method of initiating the ring-opening copolymerization of cyclopentene/the norbornene compound are carried out by adding the compound (A) of the transition metal belonging to Group 6 of the Periodic Table under the presence of the cyclopentene, the norbornene compound and the organic aluminum compound (B) may be mentioned. Alternatively, the compound (A) of the transition metal belonging to Group 6 of the Periodic Table and the organic aluminum compound (B) may be mixed in advance, then adding the cyclopentene and the norbornene compound; thereby the ring-opening copolymerization of cyclopentene/the norbornene compound may be carried out.

Also, the oxysilyl group containing olefinic unsaturated hydrocarbon (C) may be mixed with the cyclopentene and the norbornene compound in advance; or it may be mixed with cyclopentene/the norbornene compound when carrying out the ring-opening copolymerization. Further, after carrying out the ring-opening copolymerization of cyclopentene/the norbornene compound, the oxysilyl group containing olefinic unsaturated hydrocarbon (C) may be added to the obtained ring-opening copolymer to carry out the metathesis reaction with the obtained ring-opening copolymer.

In the production method of the cyclopentene ring-opening copolymer of the present invention, the ring-opening copolymerization reaction may be carried out without solvent, or it may be carried out in the solvent. As for the solvent used when carrying out the ring-opening copolymerization reaction in the solvent, it is not particularly limited as long as it is inactive during the polymerization reaction, and capable of dissolving the cyclopentene used for ring-opening copolymerization reaction, the cyclic olefin comprising the aromatic ring or the norbornene compound, other copolymerizable cyclic olefin, the compound (A) of the transition metal belonging to Group 6 of the Periodic Table, the organic aluminum compound (B) and the oxysilyl group containing olefinic unsaturated hydrocarbon (C); however the hydrocarbon based solvent is preferable. As a specific example of the hydrocarbon based solvent, for example, aromatic hydrocarbons such as benzene, toluene, xylene, ethylbenzene or so; aliphatic hydrocarbons such as n-hexane, n-heptane, n-octane or so; alicyclic hydrocarbons such as cyclohexane, cyclopentane, methylcyclohexane or so may be mentioned.

In the production method of the cyclopentene ring-opening copolymer according to first and second invention of the present invention, the polymerization temperature is preferably −100° C. or higher, more preferably −50° C. or higher, further preferably −20° C. or higher, and particularly preferably 0° C. or higher. Also, the upper limit of the polymerization temperature is not particularly limited, and it is preferably less than 100° C., more preferably less than 90° C., further preferably less than 80° C., and particularly preferably less than 70° C. If the polymerization temperature is too high, the molecular weight of the obtained cyclopentene ring-opening copolymer may become too low; and if the polymerization temperature is too low, the polymerization speed may become slow and as a result, the productivity may be deteriorated.

Also, the polymerization reaction time is preferably 1 minute to 72 hours, and more preferably 10 minutes to 20 hours.

In the production method of the cyclopentene ring-opening copolymer according to first invention of the present invention, the compound (A) of the transition metal belonging to Group 6 of the Periodic Table, the organic aluminum compound (B) and if needed the oxysilyl group containing olefinic unsaturated hydrocarbon (C) are brought into contact with cyclopentene and the cyclic olefin comprising the aromatic ring, thereby the ring-opening polymerization is initiated, and after the polymerization conversion rate has reached to predetermined value, the known polymerization terminator is added to terminate the polymerization system; thereby the cyclopentene ring-opening copolymer is produced.

Also, in the production method of the cyclopentene ring-opening copolymer according to second invention of the present invention, the compound (A) of the transition metal belonging to Group 6 of the Periodic Table, the organic aluminum compound (B) and the oxysilyl group containing olefinic unsaturated hydrocarbon (C) are brought into contact with cyclopentene and the norbornene compound, thereby the ring-opening polymerization is initiated, and after the polymerization conversion rate has reached to predetermined value, the known polymerization terminator is added to terminate the polymerization system; thereby the cyclopentene ring-opening copolymer is produced.

Note that, when using those comprising the hydroxysilyl group at the terminal of the copolymer chain as the cyclopentene ring-opening-copolymer, those comprising alkoxysilyl group, aryloxysilyl group or acyloxysilyl group is used as the oxysilyl group containing olefinic unsaturated hydrocarbon (C), and also after the polymerization reaction is terminated, the obtained ring-opening copolymer may be hydrolyzed. The hydrolysis is usually carried out by adding the predetermined amount of water to the organic solvent solution of the ring-opening copolymer, then by stirring the content. The added amount of the water is not particularly limited, but it is preferably equal mol or more with respect to oxygen atom of the oxysilyl group. Also, as the method for adding the water during the hydrolysis may be either of; the method of adding the adequate amount in the organic solvent, or the method of gradually absorbing the water in the air atmosphere. Further, the hydrolysis may be carried out at the same time as collecting the polymer by steam stripping which will be described in below.

Also, when carrying out the hydrolysis, it is preferable to control the hydrolysis reaction speed by using the acid or base catalyst. As for the acid used, inorganic acids such as hydrochloric acid, nitric acid and sulfuric acid or so; organic acids such as acetic acid and oxalic acid or so may be mentioned. Also, as the base, hydroxides such as sodium hydroxide, potassium hydroxide, magnesium hydroxide, calcium hydroxides or so; carbonates such as sodium carbonate, potassium carbonate or so; organic bases such pyridine, triethylaminnes or so may be mentioned.

The reaction temperature of the hydrolysis is preferably 0° C. to 250° C., more preferably 50° C. to 200° C. Also, the reaction time of the hydrolysis is usually one minute to 100 hours.

As the organic solvent used for the hydrolysis, it is not particularly limited, as long as the cyclopentene ring-opening copolymer can be dissolved, and for example, ether based solvents such as tetrahydrofuran, dibutylether or so; halogen based solvents such as chloroform, chlorobenzene or so; hydrocarbon based solvents such as benzene, toluene, xylene, ethylbenzene, n-hexane, cyclohexane or so may be mentioned. Also, the unreacted cyclopentene of after the polymerization can be used as the solvent. These may be used alone, or by combining two or more thereof.

Also, in the present invention, if desired, the antioxidants such as phenol based stabilizer, phosphorous based stabilizer and iodine based stabilizer may be added. The added amount of the antioxidant may be appropriately determined depending on the types thereof. Further, if the desired, an extender oil may be blended.

Further, when the polymerization reaction is carried out in the solvent using the solvent when carrying out the polymerization reaction, as the method for obtaining the polymer from the polymerization solution, it is not particularly limited and the known method may be used, and for example, the method of separating the solvent by steam stripping or so, then filtering the solids, and further drying it; thereby obtaining the solid rubber may be mentioned.

Also, the cyclopentene ring-opening copolymer obtained by the production method of the present invention has cis/trans composition ratio of the double bond present in the main chain of 40/60 to 100/0, more preferably 45/55 to 100/0, and further preferably 50/50 to 100/0 in terms of "cis/trans" ratio. If the cis ratio is 40% or more, the obtained cyclopentene ring-opening copolymer becomes amorphous, and it is preferable since the rubber characteristic at the low temperature is excellent. Particularly, in the production method of the present invention, those comprising the compound (A) of the transition metal belonging to Group 6 of the Periodic Table, and the organic aluminum compound (B) are used as the polymerization catalyst, thus even when the polymerization reaction is carried out under the condition of 20° C. or higher which is relatively high temperature condition, the cis ratio of the obtained cyclopentene ring-opening copolymer can be 40% or higher; thereby cyclopentene ring-opening copolymer which is amorphous and having excellent rubber characteristic at the low temperature can be obtained. In addition to this, for the production method of the present invention, even when the polymerization reaction is carried out under the condition of 20° C. or higher which is relatively high temperature condition, regardless of the polymerization batch and the polymerization scale, the cis ratio of the obtained cyclopentene ring-opening copolymer can be stabilized, and the excellent polymerization stability can be obtained.

(The Rubber Composition)

The rubber composition of the present invention comprises the filler to the cyclopentene ring-opening copolymer according to the first and the second invention of the present invention.

As the filler, it is not particularly limited, and silica and/or the carbon black may be mentioned.

As the specific examples of silica as the filler, a dry method white carbon, a wet method white carbon, colloidal silica, precipitated silica or so may be mentioned. Also, carbon-silica dual-phase-filler wherein the silica is held on the surface of the carbon black may be used. Among these, a wet method white carbon wherein the hydrated silicate is the main component is preferable. These may be used alone or by combining two or more thereof.

The silica as the filler has the nitrogen absorption specific surface area of preferably 50 to 300 $m^2/g$, more preferably 80 to 220 $m^2/g$, and particularly preferably 100 to 170 $m^2/g$. When the specific surface area is within the above range, the rubber composition can have excellent low heat buildup property. Also, pH of the silica is preferably less than 7, more preferably 5 to 6.9. Note that, the nitrogen absorption specific surface area can be measured by BET method in accordance with ASTM D3037-81.

The blending amount in case of using the silica as the filler is preferably 1 to 150 parts by weight, more preferably 10 to 120 parts by weight, further preferably 15 to 100 parts by weight, and particularly preferably 20 to 80 parts by weight, with respect to 100 parts by weight of the rubber component in the rubber composition. By setting the blending amount of the silica within the above range, the low heat buildup property of the rubber composition can be particularly excellent. If the blending amount of the silica is too little, or too much, the low heat buildup property of the rubber composition may be lowered.

Note that, when blending the silica as the filler, from the point of further improving the low heat buildup property of the rubber composition, a silane coupling agent is preferably further blended. As the silane coupling agent, for example, β-(3,4-epoxycyclohexyL)ethyltrimethoxy silane, N-(β-aminoethyl)-γ-aminopropyltrimethoxy silane, 3-octathio-l-propyl-triethoxy silane, bis-(3-(triethoxysilyl)propyl)disulfide, bis(3-(triethoxysiLyl)propyl)tetrasulfide, γ-trimethoxysilylpropyldimethylthiocarbamyltetrasulfide, γ-trimethoxysilylpropylbenzothiazyltetrasulfide or so may be mentioned. Among these, those having 4 or less sulfurs in one molecule are preferable from the point of avoiding the scorch during the kneading. These silane coupling agents can be used alone or by combining two or more. The blending amount of the silane coupling agent is preferably 0.1 to 30 parts by weight, more preferably 1 to 15 parts by weight with respect to 100 parts by weight of the silica.

Also, as the carbon black as the filler, a furnace black, an acetylene black, a thermal black, a channel black, a graphite or so may be mentioned. Among these, it is preferable to use the furnace black, and as the specific examples, SAF, ISAF, ISAF-HS, ISAF-LS, IISAF-HS, HAF, HAF-HS, HAF-LS, T-NS, MAF, FEF or so may be mentioned. These may be used alone or may be used by combining two or more thereof.

The carbon black as the filler has the nitrogen absorption specific surface area of preferably 5 to 200 $m^2/g$, more preferably 20 to 130 $m^2/g$, and further preferably 40 to 80 $m^2/g$. Also, dibutyl phthalate (DBP) absorption amount of the carbon black as the filler is preferably 5 to 200 ml/100 g, more preferably 50 to 160 ml/100 g, and further preferably 70 to 130 ml/100 g. When the specific surface area and dibutyl phthalate absorption amount of the carbon black are within the above range, the rubber composition has good molding property, and excellent low heat buildup property.

The blending amount in case of using the carbon black as the filler is preferably 1 to 150 parts by weight, more preferably 2 to 120 parts by weight, further preferably 15 to 100 parts by weight, and particularly preferably 30 to 80 parts by weight with respect to 100 parts by weight of the rubber component in the rubber composition. When the blending amount of the carbon black is within the above range, the low heat buildup property of the rubber composition can be made particularly good. If the blending amount of the carbon black is too little or too much, the low heat buildup property of the rubber composition may decline.

Also, in case of blending both the silica and the carbon black in the rubber composition of the present invention, the total amount of the silica and the carbon black is preferably 25 to 120 parts by weight and more preferably 30 to 100 parts by weight with respect to 100 parts by weight of the rubber component in the rubber composition.

Further, the rubber composition of the present invention preferably comprise, as the rubber component, other rubbers besides the cyclopentene ring-opening copolymer according to the first and the second invention of the present invention. As other rubbers, for example, natural rubber, polyisoprene rubber, emulsion polymerization styrene-butadiene copolymer rubber, solution polymerization styrene-butadiene copolymer rubber, polybutadiene rubber (it may be polybutadiene rubber including the crystal fiber made of 1,2-polybutadiene polymer), styrene-isoprene copolymer rubber, butadiene-isoprene copolymer rubber, styrene-isoprene-butadiene copolymer rubber, acrylonitrile-butadiene copolymer rubber, acrylonitrile-styrene-butadiene copolymer rubber or so may be mentioned. Among these, the natural rubber, polyisoprene rubber, polybutadiene rubber, and styrene-butadiene copolymer rubber are preferably used. These may be used alone or by combining two or more thereof.

In case other rubbers besides the cyclopentene ring-opening copolymer is added to the rubber composition of the present invention, the content ratio of cyclopentene ring-opening copolymer is preferably 5 to 90 wt %, more preferably 10 to 80 wt %, and more preferably 20 to 70 wt % in the rubber component. By setting the content ratio of the cyclopentene ring-opening copolymer within the above mentioned range, the rubber composition can have good molding property and excellent wet grip property.

Also, other than the above component according to the normal method, the rubber composition of the present invention may be blended with necessary amounts of the crosslinking agent, the crosslinking accelerator, the crosslinking activating agent, the antioxidant, the activating agent, the process oil, the plasticizer, the smoothing agent, the filler, the adhesiveness imparting agent, and aluminum hydroxide or so.

As the crosslinking agent, for example, sulfur, halogenated sulfur, organic peroxides, quinone dioximes, organic polyvalent amine compounds, alkylphenol resin comprising the methylol group or so may be mentioned. Among these, sulfur is preferably used. The blending amount of the crosslinking agent is preferably 0.5 to 5.0 parts by weight, more preferably 0.8 to 4.0 parts by weight, and particularly preferably 1.0 to 3.0 parts by weight with respect to 100 parts by weight of the rubber component in the rubber composition.

As the crosslinking accelerator, sulfenaimde based crosslinking accelerator such as N-cyclohexyl-2-benzothiazylsulfenamide, N-t-butyl-2-benzothiazolesulfenamide, N-oxyethylene-2-benzothiazolesulfenamide, N-oxyethylene-2-benzothiazolesulfenamide, N,N'-diisopropyl-2-benzothiazolesulfenamide or so; guanidine based crosslinking accelerator such as diphenyl guanidine, diorthotolylguanidine, orthotolylbiguanidine or so; thiourea based crosslinking accelerator; thiazole based crosslinking accelerator; thiuram based crosslinking accelerator; dithiocarbamic acid based crosslinking accelerator; xanthogen acid based crosslinking accelerator or so may be mentioned. Among these, those comprising the sulfenamide based crosslinking agent are particularly preferable. These crosslinking accelerators may be used alone or by combining two or more thereof. The blending amount of the crosslinking accelerator is preferably 0.1 to 15 parts by weight, more preferably 0.5 to 5 parts by weight, and particularly preferably 1.0 to 4.0 parts by weight with respect to 100 parts by weight of the rubber component in the rubber composition.

As the crosslinking activating agent, for example, a higher fatty acid such as stearic acid, or zinc oxides or so may be mentioned. The blending amount of the crosslinking activating agent is not particularly limited, and the blending amount when using the higher fatty acids as the crosslinking activating agent is preferably 0.05 to 15 parts weight, more preferably 0.5 to 5 parts by weight with respect to 100 parts by weight of the rubber component in the rubber composition; the blending amount when using zinc oxides as the crosslinking activating agent is preferably 0.05 to 10 parts by weight, and more preferably 0.5 to 3 parts by weight with respect to 100 parts by weight of the rubber component in the rubber composition.

As the process oil, for example petroleum based softeners such as paraffin type, aromatic group type, naphthene type or so; plant based softeners; fatty acids or so may be mentioned.

As other blending agents, for example, the activating agents such as diethylene glycol, polyethylene glycol, silicone oil or so; the fillers such as calcium carbonate, talc, clay or so; the adhesiveness imparting agent such as petroleum resin, coumarone resin or so; wax or so may be mentioned.

In order to obtain the rubber composition of the present invention, each component is kneaded according to the normal method, and for example the blending agent which does not include the crosslinking agent and the crosslinking accelerator, the filler and the rubber component is kneaded, then to the kneaded product thereof, the crosslinking agent and the crosslinking accelerator are mixed and the composition of object can be obtained. The kneading temperature of the rubber component and the blending agent which does not include the crosslinking agent and the crosslinking accelerator is preferably 80 to 200° C., and more preferably 20 to 180° C. Also, the kneading time is preferably 30 seconds to 30 minutes. The mixing of the kneaded product with the crosslinking agent and the crosslinking accelerator is carried out usually at 100° C. or less, preferably 80° C. or less. Note that, when obtaining the rubber composition of the present invention, the method of adding the blending agent and the filler to the solid rubber then kneading (the dry kneading method); or the method of adding the blending agent and the filler to the solution of the rubber then solidifying and drying (the wet kneading method) may be used.

By using above mentioned characteristics, the cyclopentene ring-opening copolymer and the rubber composition of the present invention can be used for various purposes, for example various parts of tires such as tread, carcass, side wall and toe of bead or so; rubber products such as hose, window frame, belt, shoe sole, anti-vibration rubber, automobile parts or so; and further the anti-impact polystyrene, resin reinforced rubber such as ABS resin or so. Particularly, the cyclopentene ring-opening copolymer and the rubber composition of the present invention has excellent wet grip property and the low heat buildup property, it is suitably used for cap tread or base tread of tires, or shoe sole; and most preferably it is used for cap tread or base tread of tires.

EXAMPLES

Hereinafter, the present invention will be described based on further detailed examples, however the present invention is not limited thereto. Note that, in the below, "parts" is based on weight unless mentioned otherwise. Also, the tests and evaluations were carried out as follows.

<The Molecular Weight>

The number average molecular weight (Mn), the weight average molecular weight (Mw) and the molecular weight distribution (Mw/Mn) of the cyclopentene ring-opening copolymer were measured in terms of polystyrene conversion value, using gel-permeation-chromatography (GPC) of which the solvent is tetrahydrofuran.

<The Content of the Aromatic Ring in the Cyclopentene Ring-opening Copolymer>

The ratio of the aromatic ring in the cyclopentene ring-opening copolymer with respect to entire polymer was obtained from $^1$H-NMR spectrometry.

<The Ratio of the Cyclopentene Structural Unit and the Norbornene Compound Structural Unit>

The monomer composition ratio in the cyclopentene ring-opening copolymer was obtained from $^1$H-NMR spectrometry.

<The Cis/Trans Ratio of the Main Chain Double Bond>

The cis/trans ratio of main chain double bond in the cyclopentene ring-opening copolymer was obtained from $^{13}$C-NMR spectrometry.

<The Oxysilyl Group Introduction Rate>

For the cyclopentene ring-opening copolymer, the measurement of the ratio of the peak integral value characteristics to the oxysilyl group and the peak integral value derived from olefin was carried out by $^1$H-NMR spectrometry. Then, based on the results of the ratio of the measured peak integral values and the number average molecular weight (Mn) by above mentioned GPC, thereby the oxysilyl group introduction rate was calculated. The oxysilyl group introduction rate was set as the ratio of the number of the oxysilyl group with respect to the number of the cyclopentene ring-opening copolymer chain. That is, the oxysilyl group introduction rate=100% indicates the rate wherein one oxysilyl group is introduced against one copolymer chain.

<The Mooney Viscosity ($ML_{1+4}$, 100° C.)>

The Mooney viscosity ($ML_{1+4}$, 100° C.) of cyclopentene ring-opening copolymer was measured in accordance with JIS K6300.

<The Glass Transition Temperature (Tg)>

The glass transition temperature of the cyclopentene ring-opening copolymer was measured at the temperature rising rate of 10° C./min using Differential scanning calorimetry (DSC).

<The Wet Grip Property>

The test samples was produced by carrying out the press-crosslinking to the rubber composition for 20 minutes at 160° C., and using ARES made by Rheometric Scientific, Inc to the test samples obtained; then tan δ was measured at 0° C. under the condition of the dynamic distortion of 0.5% and 10 Hz. Further, for the examples of 1 to 4, the obtained measurement results were calculated as the index taking the measured value of the sample of the comparative example 1 as 100. Also, for the examples 5 to 10, the obtained measured results were calculated as the index taking the measured value of the sample of the comparative example 3 as 100. The larger this index is, the more excellent the wet grip property is.

<The Low Heat Buildup Property>

The test samples was produced by carrying out the press-crosslinking to the rubber composition for 20 minutes at 160° C., and using ARES made by Rheometric Scientific, Inc to the test samples obtained; then tan δ was measured at 60° C. under the condition of the dynamic distortion of 2.0% and 10 Hz. Further, for the examples of 1 to 4, the obtained measurement results were calculated as the index taking the measured value of the sample of the comparative example 1 as 100. Also, for the examples 5 to 10, the obtained measured results were calculated as the index taking the measured value of the sample of the comparative example 3 as 100. The smaller this index is, the more excellent the wet grip property is.

Reference Example 1

Preparation of the diisobutylaluminummono(n-butoxide)/toluene Solution (2.5 wt %)

The diisobutylaluminummono(n-butoxide)/toluene solution (2.5 wt %) was prepared as same as the reference example 2 except for using 0.74 parts of n-butanol (the equivalent mol amount with respect to triisobutylaluminum) instead of 1.02 parts of n-hexanol (the equivalent mol amount with respect to triisobutylaluminum).

Reference Example 2

Preparation of the diisobutylaluminummono(n-hexoxide)/toluene Solution (2.5 wt %)

To the glass container with the stirrers, 88 parts of toluene and 7.8 parts of diisobutylaluminum/n-hexane solution (made by Tosoh Finechem Corporation) of 25.4 wt % were added under the nitrogen atmosphere. Then, it was cooled to −45° C., and while rigorously stirring, 1.02 parts of n-hexanol (the equivalent mol amount with respect to triisobutylaluminum) was dripped in. Then, it was cooled to room temperature while stirring, thereby diisobutylaluminum-mono (n-hexoxide)/toluene solution (2.5wt %) was prepared.

Example 1

To the pressure resistant glass reaction container with a stirrer, 8.7 parts of $WCl_6$/toluene solution of 1.0 wt %, 4.3 parts of diisobutylaluminummono(n-butoxide)/toluene solution of 2.5 wt % which was prepared in the reference example 1 were added under the nitrogen atmosphere, and stirred for 10 minutes, then 0.039 parts of ethyl acetate was added and it was stirred for 10 minutes; thereby the catalyst solution was obtained. Then, to the pressure resistant glass reaction container with a stirrer, 100 parts of cyclopentene, 50 parts of 5-phenyl-2-norbornene (PhNB) and 0.35 parts of vinyltris(trimethylsiloxy)silane were added under the nitrogen atmosphere, then 13 parts of the catalyst solution prepared in the above was added, and the polymerization reaction was carried out for 6 hours at 25° C. After 6 hours of the polymerization reaction, an excessive amount of isopropanol was added to terminate the polymerization, then the solution in the pressure resistant glass reaction container was poured to excessive amount of isopropanol including 2,6-di-t-butyl-p-cresol (BHT). Next, the precipitated polymers were collected, and washed with isopropanol, then vacuum dried for 3 days at 40° C., thereby 99 parts of cyclopentene ring-opening copolymer was obtained. For the obtained ring-opening copolymer, in accordance with the above mentioned methods, the molecular weight, the cis/trans ratio of the main chain double bond, the content of the aromatic ring, the oxysilyl group introduction rate, the Mooney viscosity ($ML_{1+4}$, 100° C.) and the glass transition temperature (Tg) were measured. The results are shown in Table 1.

100 parts of cyclopentene ring-opening copolymer obtained in the above was masticated by Banbury mixer having the capacity of 250 ml, then 50 parts of silica (the product name "Zeosil 1165MP" made by Solvay Japan, Ltd, the nitrogen absorption specific surface area (BET method): 163 $m^2$/g), 10 parts of the process oil (the product name "aromax T-DAE" made by Nippon Oil Corporation), 6.0 parts of silane coupling agent (bis(3-(triethoxysilyl)propyl) tetrasulfide, the product name "Si69" made by Evonik Degussa Japan Co., Ltd) were added thereto, and kneaded for 1.5 minutes from the starting temperature of 110° C. To this kneaded product, 25 parts of silica (the product name "Zeosil 1165MP" made by Solvay Japan, Ltd), 3 parts of zinc oxide (flower of zinc (I)), 2.0 parts of stearic acid (the product name "SA-300" made by ADEKA CORPORATION), 2.0 parts of antioxidant (N-phenyl-N'-(1,3-dimethylbutyl)-p-phenylenediamine, the product name "NOCRAC 6C" made by OUCHI SHINKO CHEMICAL INDUSTRIAL CO.,LTD) were added; then it was kneaded for 2.5 minutes, and the rubber composition was discharged from Banbury mixer. The temperature of the rubber composition after completing the kneading was 150° C. This rubber composition was cooled to the room temperature, then it was kneaded for 3 minutes in Banbury mixer again, then the rubber composition was discharged from Banbury mixer. Next, in the open roll of 50° C., the obtained rubber composition, 1.5 parts of sulfur, and the crosslinking accelerator (the mixture of 1.8 parts of N-t-butyl-2-benzothiazolesulfenamide (the product name "NOCCELER NS" made by OUCHI SHINKO CHEMICAL INDUSTRIAL CO., LTD) and 1.5 parts of diphenylguanidine (the product name "NOCCELER D" made by OUCHI SHINKO CHEMICAL INDUSTRIAL CO., LTD)) were kneaded; then the rubber composition of the sheet form was taken out. The test sample was made by carrying out the press-crosslinking for 20 minutes at 160° C. to this rubber composition; and the wet grip property and the low heat buildup property of this test sample were evaluated. The results are shown by Table 1. Note that, these evaluations are shown in the index taking the comparative example 1 as the standard sample (index of 100).

Example 2

To the pressure resistant glass reaction container with a stirrer, 120 parts of cyclopentene, 30 parts of 5-phenyl-2-cyclooctene (PhCOE) were added, under the nitrogen atmosphere, then 1.3 parts of triethylaluminum/n-hexane solution of 1 mol/L, 2.8 parts of 2,2,2-trichloroethanol/cyclohexane solution of 1 mol/L were added, then stirred. Then, 0.15 parts of 2-butene-1,4-di(triethoxysilane) and 0.5 parts of tridodecylammoniummolybdate/cyclohexane of 37 wt % were added the polymerization reaction was carried out for 2 hours at 25° C. Then, to the pressure resistant glass reaction container, excessive amount of isopropanol was poured to terminate the polymerization, and the solution in the pressure resistant glass reaction container was poured to excessive amount of isopropanol including 2,6-di-t-butyl-p-cresol (BHT). Then, the precipitated polymer was collected, and washed with isopropanol, then vacuum dried for 3 days at 40° C., thereby 42 parts of cyclopentene ring-opening copolymer was obtained. Next, the rubber composition was obtained as same as the example 1. Then, for obtained cyclopentene ring-opening copolymer and the rubber composition, the evaluations of same as the example 1 were carried out. The results are shown in Table 1.

Example 3

To the pressure resistant glass reaction container with a stirrer, 8.7 parts of $WCl_6$/toluene solution of 1.0 wt %, 4.3 parts of diisobutylaluminummono(n-hexoxide)/toluene solution of 2.5 wt % which was prepared in the reference example 2 were added under the nitrogen atmosphere, and stirred for 10 minutes, then it was stirred for 10 minutes; thereby the catalyst solution was obtained. Then, to the pressure resistant glass reaction container with a stirrer, 100 parts of cyclopentene and 50 parts of 1,4-methano-1,4,4a,9a-tetrahydro-9H-fluorene (MTHF) were added under the nitrogen atmosphere, then 13 parts of the catalyst solution prepared in the above was added thereto, and the polymerization reaction was carried out for 6 hours at 25° C. After 6 hours of the polymerization reaction, an excessive amount of isopropanol was added to the pressure resistant reaction container to terminate the polymerization, and then the solution in the pressure resistant glass container was poured to excessive amount of isopropanol including 2,6-di-t-butyl-p-cresol (BHT). Next, the precipitated polymers were collected, and washed with isopropanol, and then vacuum dried for 3 days at 40° C., thereby 77 parts of cyclopentene ring-opening copolymer was obtained. For the obtained ring-opening copolymer, in accordance with the above mentioned methods, the molecular weight, the cis/trans ratio of the main chain double bond, the content of the aromatic ring, the oxysilyl group introduction rate, the Mooney viscosity ($ML_{1+4}$, 100° C.) and the glass transition temperature (Tg) were measured. The results are shown in Table 1. Further, the rubber composition was obtained and evaluated as same as the example 1. The results are shown in Table 1.

Example 4

65 parts of cyclopentene ring-opening copolymer was obtained as same as the example 2 except for using 100 parts of cyclopentene and 50 parts of 5-phenyl-2-cyclooctene (PhCOE), and carrying out the polymerization reaction for 24 hours at 0° C. Further, the rubber composition was obtained and evaluated as same as the example 1. The results are shown in Table 1.

Comparative Example 1

Cyclopentene ring-opening homopolymer was obtained as same as the example 1 except for adding 150 parts of cyclopentene and not adding vinyltris(trimethylsiloxy)silane instead of 100 parts of cyclopentene and 50 parts of 5-phenyl-2-norbornene (PhNB). Further, the rubber composition was obtained as same as the example 1. Then, for obtained cyclopentene ring-opening polymer and the rubber composition, the evaluations of same as the example 1 were carried out. The results are shown in Table 1.

Comparative Example 2

115 parts of cyclopentene ring-opening copolymer was obtained as same as the example 1, except for using the polymerization catalyst solution wherein 0.19 parts of (1,3-dimethylimidazolidine-2-ylidene)(tricyclohexylphosphine) benzylidine rutheniumdichloride is dissolved in 10 parts of toluene, instead of 8.7 parts of $WCl_6$/toluene solution of 1.0 wt %, 4.3 parts of diisobutylaluminummono(n-butoxide)/toluene solution of 2.5 wt %. The results are show in Table 1. Also, the rubber composition was tried to obtain as similar to the example 1, however the molecular weight was low and suitable kneaded product was unable to obtain.

TABLE 1

| | Polymerization catalyst | | | | | Cyclopentene ring-opening copolymer | |
|---|---|---|---|---|---|---|---|
| | Compound (A) of transition metal belonging to Group 6 of Periodic Table | Organic aluminum compound (B) | Oxygen atom containing hydrocarbon compound | Cyclic olefin containing aromatic ring | Oxysilyl group containing olefinic unsaturated hydrocarbon (C) | Weight average molecular weight (Mw) | Molecular weight distribution (Mw/Mn) |
| Example 1 | $WCl_6$ | $(iBu)_2Al(OnBu)$ | Ethyl acetate | PhNB | vinyltris(trimethylsiloxy)silane | 356,000 | 2.15 |
| Example 2 | $[(n\text{-}C_{12}H_{25})_3NH]_4Mo_8O_{26}$ | $EtAl(OCH_2CCl_3)_2$ | — | PhCOE | 2-butene-1,4-di(triethoxysilane) | 485,000 | 1.80 |
| Example 3 | $WCl_6$ | $(iBu)_2Al(OnHex)$ | — | MTHF | — | 315,000 | 2.12 |
| Example 4 | $[(n\text{-}C_{12}H_{25})_3NH]_4Mo_8O_{26}$ | $EtAl(OCH_2CCl_3)_2$ | — | PhCOE | 2-butene-1,4-di(triethoxysilane) | 688,000 | 2.05 |
| Comparative example 1 | $WCl_6$ | $(iBu)_2Al(OnBu)$ | Ethyl acetate | None | — | 434,000 | 1.89 |

TABLE 1-continued

| | | | | | | | |
|---|---|---|---|---|---|---|---|
| Comparative example 2 | 1,3-dimethylimidazolidine-2-ylidene)(tricyclohexylphosphine)benzylideneruthenium dichloride | | PhNB | vinyltris(trimethylsiloxy)silane | | 96,000 | 1.48 |

| | Cyclopentene ring-opening copolymer | | | | | Rubber composition | |
|---|---|---|---|---|---|---|---|
| | Cis/trans ratio of main chain double bond | Content ratio of aromatic ring (%) | Oxysilyl group introduction rate (%) | Mooney viscosity (ML$_{1+4}$, 100° C.) | Tg (° C.) | Wet grip property (index) | Low heat buildup property (index) |
| Example 1 | 65/35 | 27 | 89 | 46 | −25 | 115 | 87 |
| Example 2 | 70/30 | 24 | 150 | 59 | −32 | 118 | 78 |
| Example 3 | 58/42 | 16 | — | 35 | −19 | 112 | 100 |
| Example 4 | 75/25 | 34 | 186 | 68 | −15 | 120 | 76 |
| Comparative example 1 | 65/35 | 0 | — | 48 | −105 | 100 | 100 |
| Comparative example 2 | 15/85 | 20 | 100 | 12 | −42 | Unable to evaluate | |

Example 5

To the pressure resistant glass reaction container with a stirrer, 8.7 parts of WCl$_6$/toluene solution of 1.0 wt %, 4.3 parts of diisobutylaluminummono(n-hexoxide)/toluene solution of 2.5 wt % which was prepared in the reference example 2 were added under the nitrogen atmosphere, and stirred for 15 minutes thereby the catalyst solution was obtained. Then, to the pressure resistant glass reaction container with a stirrer, 100 parts of cyclopentene and 50 parts of dicyclopentadiene (DCPD) were added under the nitrogen atmosphere, then 13 parts of the catalyst solution prepared in the above was added, and the polymerization reaction was carried out for 6 hours at 25° C. After 6 hours of the polymerization reaction, an excessive amount of isopropanol was added to the pressure resistant glass reaction container to terminate the polymerization, and then the solution in the pressure resistant glass reaction container was poured to excessive amount of isopropanol including 2,6-di-t-butyl-p-cresol (BUT). Next, the precipitated polymers were collected, and washed with isopropanol, and then vacuum dried for 3 days at 40° C., thereby 85 parts of cyclopentene ring-opening copolymer was obtained. For the obtained ring-opening copolymer, in accordance with the above mentioned methods, the molecular weight, the ratio of cyclopentene/dicyclopentadiene the cis/trans ratio of the main chain double bond, the oxysilyl group introduction rate, the Mooney viscosity (ML$_{1+4}$, 100° C.) and the glass transition temperature (Tg) were measured. The results are shown in Table 2.

100 parts of cyclopentene ring-opening copolymer obtained in the above was masticated by Banbury mixer having the capacity of 250 ml, then 50 parts of silica (the product name "Zeosil 1165MP" made by Solvay Japan, Ltd, the nitrogen absorption specific surface area (BET method): 163 m$^2$/g), 10 parts of process oil (the product name "aromax T-DAE" made by Nippon Oil Corporation) and 6.0 parts of the silane coupling agent (bis(3-(triethoxysilyl)propyl)tetrasulfide, the product name "Si69" made by Evonik Degussa Japan Co., Ltd) were added thereto, and kneaded for 1.5 minutes from the starting temperature of 110° C. To this kneaded product, 25 parts of silica (the product name "Zeosil 1165MP" made by Solvay Japan, Ltd), 3 parts of zinc oxide (flower of zinc (I)), 2.0 parts of stearic acid (the product name "SA-300" made by ADEKA CORPORATION) and 2.0 parts of antioxidant (N-phenyl-N'-(1,3-dimethylbutyl)-p-phenylenediamine, the product name "NOCRAC 6C" made by OUCHI SHINKO CHEMICAL INDUSTRIAL CO., LTD) were added; then it was kneaded for 2.5 minutes, and the rubber composition was discharged from Banbury mixer. The temperature of the rubber composition after completing the kneading was 150° C. This rubber composition was cooled to the room temperature, then it was kneaded for 3 minutes in Banbury mixer again, then the rubber composition was discharged from Banbury mixer. Next, in the open roll of 50° C., the obtained rubber composition, 1.5 parts of sulfur and the crosslinking accelerator (the mixture of 1.8 parts of N-t-butyl-2-benzothiazolesulfenamide (the product name "NOCCELER NS" made by OUCHI SHINKO CHEMICAL INDUSTRIAL CO., LTD) and 1.5 parts of diphenylguanidine (the product name "NOCCELER D" made by OUCHI SHINKO CHEMICAL INDUSTRIAL CO., LTD)) were kneaded; then the rubber composition of the sheet form was taken out. The test sample was made by carrying out the press-crosslinking for 20 minutes at 160° C. to this rubber composition; and the wet grip property and the low heat buildup property of this test sample were evaluated. The results are shown in Table 2. Note that, these evaluations are shown in the index taking the comparative example 3 as the standard sample (index of 100).

Example 6

The cyclopentene ring-opening copolymer was obtained as same as the example 5 except that 0.20 parts of vinyl (triethoxy)silane was added at the same time of adding 100 parts of cyclopentene and 50 parts of dicyclopentadiene (DCPD). Further, the rubber composition was produced as same as the example 5 and evaluated. These results are shown in Table 2.

Example 7

To the pressure resistant glass reaction container with a stirrer, 8.7 parts of WCl$_6$/toluene solution of 1.0 wt %, 4.3 parts of diisobutylaluminummono(n-butoxide)/toluene solution of 2.5 wt % which was prepared in the reference example 1 were added under the nitrogen atmosphere, and stirred for 10 minutes, then 0.039 parts of ethyl acetate was added and stirred for 10 minutes; thereby the catalyst solution was obtained. Then, to the pressure resistant glass reaction container with a stirrer, 75 parts of cyclopentene, 75 parts of 5-phenyl-2-norbornene (PhNB) and 0.35 parts of vinyltris(trimethylsiloxy)silane were added under the nitrogen atmosphere, then 13 parts of the catalyst solution prepared in the above was added, and the polymerization reaction was carried out for 6 hours at 25° C. After 6 hours of the polymerization reaction, an excessive amount of isopropanol was added to the pressure resistant glass reaction container to terminate the polymerization, then the solution in the pressure resistant glass container was poured to excessive amount of isopropanol including 2,6-di-t-butyl-p-cresol (BHT). Next, the precipitated polymers were collected, and washed with isopropanol, then vacuum dried for 3 days at 40° C., thereby 99 parts of cyclopentene ring-opening copolymer was obtained. Then, the rubber composition was obtained as same as the example 5. Then, for the obtained cyclopentene ring-opening copolymer and the rubber composition, the evaluations same as the example 5 were carried out. The results are shown in Table 2.

Example 8

To the pressure resistant glass reaction container with a stirrer, 110 parts of cylopentene and 30 parts of tetracyclo [6.2.1.1$^{3,6}$.0$^{2,7}$]dodeca-4-ene (TCD) were added under the nitrogen atmosphere, then 1.3 parts of triethylaluminum/n-hexane solution of 1 mol/L and 2.8 parts of 2,2,2-trichloroethanol/cyclohexane solution of 1 mol/L were added and stirred. Then, 0.15 parts of 2-butene-1,4-di(triethoxysilane) and 0.5 parts of tridodecylammoniummolybdate/cyclohexane of 37 wt % were added; then the polymerization reaction was carried out for 2 hours at 25° C. Then, to the pressure resistant glass reaction container, excessive amount of isopropanol was poured in to terminate the polymerization, and the solution in the pressure resistant glass reaction container was poured to excessive amount of isopropanol including 2,6-di-t-butyl-p-cresol (BHT). Then, the precipitated polymer was collected, and washed with isopropanol, then vacuum dried for 3 days at 40° C.; thereby 42 parts of cyclopentene ring-opening copolymer was obtained. Next, the rubber composition was obtained as same as the example 5. Then, for obtained cyclopentene ring-opening copolymer and the rubber composition, the evaluations same as the example 5 were carried out. The results are shown in Table 2.

Example 9

77 parts of cyclopentene ring-opening copolymer was obtained as same as the example 5, except that 50 parts of dicyclopentadiene (DCPD) was changed to 50 parts of 1,4-methano-1,4,4,a,9a-tetrahydro-9H-fluorene (MTHF). Further, the rubber composition was produced as same as the example 5, and evaluated. These results are shown in Table 2.

Example 10

95 parts of cyclopentene ring-opening copolymer was obtained as same as the example 5, except that dicylopentadiene (DCPD) was changed to 2-norbornene (NB), and 0.035 parts of 1,4-dioxane was added as the oxygen containing hydrocarbon compound. Further, the rubber composition was produced as same as the example 5, and evaluated. These results are shown in Table 2.

Comparative Example 3

Cyclopentene ring-opening homopolymer was obtained by carrying out the polymerization as same as the example 5 except that 150 parts of cyclopentene was used instead of 100 parts of cyclopentene and 50 parts of dicyclopentadiene (DCPD). Next, the rubber composition was obtained as same as the example 5. Then, for obtained cyclopentene polymer copolymer and the rubber composition, the evaluations of same as the example 5 were carried out. The results are shown in Table 2.

Comparative Example 4

116 parts of cyclopentene ring-opening copolymer was obtained as same as the example 6 except for using the polymerization catalyst solution wherein 0.19 parts of (1,3-dimethylimidazolidine-2-ylidene)(tricyclohexylphosphine) benzylidine rutheniumdichloride is dissolved in 10 parts of toluene, instead of 8.7 parts of WCl$_6$/toluene solution of 1.0 wt %, 4.3 parts of diisobutylaluminummono(n-hexoxide)/toluene solution of 2.5 wt %. The results are shown in Table 2. Also, the rubber composition was tried to obtain as similar to the example 5, however the molecular weight was low and suitable kneaded product was unable to obtain.

TABLE 2

| | Polymerization catalyst | | | | | Cyclopentene ring-opening copolymer | |
|---|---|---|---|---|---|---|---|
| | Compound (A) of transition metal belonging to Group 6 of Periodic Table | Organic aluminum compound (B) | Oxygen atom containing hydrocarbon compound | Norbornene compound | Oxysilyl group containing olefinic unsaturated hydrocarbon (C) | Weight average molecular weight (Mw) | Molecular weight distribution (Mw/Mn) |
| Example 5 | WCl$_6$ | (iBu)$_2$Al(OnHex) | — | DCPD | — | 385,000 | 2.01 |
| Example 6 | WCl$_6$ | (iBu)$_2$Al(OnHex) | — | DCPD | vinyltriethoxysilane | 339,000 | 2.04 |
| Example 7 | WCl$_6$ | (iBu)$_2$Al(OnBu) | ethyl acetate | PhNB | vinyltris(trimethylsiloxy)silane | 356,000 | 2.15 |
| Example 8 | [(n-C$_{12}$H$_{25}$)$_3$NH]$_4$Mo$_8$O$_{26}$ | EtAl(OCH$_2$CCl$_3$)$_2$ | — | TCD | 2-butene-1,4-di(triethoxysilane) | 485,000 | 1.80 |
| Example 9 | WCl$_6$ | (iBu)$_2$Al(OnHex) | — | MTHF | — | 315,000 | 2.12 |
| Example 10 | WCl$_6$ | (iBu)$_2$Al(OnHex) | dioxane | NB | — | 652,000 | 2.40 |
| Comparative example 3 | WCl$_6$ | (iBu)$_2$Al(OnHex) | — | NONE | — | 433,600 | 1.89 |
| Comparative example 4 | 1,3-dimethylimidazolidine-2-ylidene)(tricyclohexylphosphine)benzylidenerutheniumdichloride | | | DCPD | vinyltriethoxysilane | 88,000 | 1.40 |

TABLE 2-continued

|  | Cyclopentene ring-opening copolymer | | | | | | Rubber composition | |
|---|---|---|---|---|---|---|---|---|
|  | Cis/trans ratio of main chain double bond | Ratio of cyclopentene structural unit (wt %) | Ratio of compound structural unit (wt %) | Oxysilyl group introduction rate (%) | Mooney viscosity ($ML_{1+4}$, 100° C.) | Tg (° C.) | Wet grip property (index) | Low heat buildup property (index) |
| Example 5 | 64/36 | 65 | 35 | — | 45 | −26 | 110 | 88 |
| Example 6 | 60/40 | 67 | 33 | 100 | 42 | −31 | 112 | 85 |
| Example 7 | 65/35 | 62 | 38 | 89 | 46 | −25 | 115 | 87 |
| Example 8 | 67/33 | 78 | 22 | 150 | 59 | −36 | 117 | 78 |
| Example 9 | 58/42 | 69 | 31 | — | 35 | −19 | 112 | 100 |
| Example 10 | 65/35 | 52 | 48 | — | 65 | −33 | 110 | 97 |
| Comparative example 3 | 62/38 | 100 | 0 | — | 48 | −105 | 100 | 100 |
| Comparative example 4 | 17/83 | 72 | 28 | 100 | 12 | −42 | Unable to evaluate | |

The invention claimed is:

1. A cyclopentene ring-opening copolymer including a structural unit derived from a cyclopentene and a structural unit derived from a norbornene compound, wherein a content of the structural unit derived from a cyclopentene with respect to an entire structural unit of said copolymer is 50 to 85 wt % in terms of weight ratio, a content of the structural unit derived from a norbornene compound with respect to an entire structural unit of said copolymer is 15 to 50 wt % in terms of weight ratio, a weight average molecular weight (Mw) is 200,000 to 1,000,000, the glass transition temperature (Tg) of the ring-opening copolymer is −40° C. or more and −5° C. or less, and a cis/trans composition ratio of the double bond present in the main chain is 40/60 to 67/33,
wherein said norbornene compound is at least one selected from bicyclo[2.2.1]hept-2-enes with no substitution or comprising hydrocarbon substituent group, said bicyclo[2.2.1]hept-2-enes are selected from 2-norbornene, 5-methyl-2-norbornene, 5-ethyl-2-norbornene, 5-butyl-2-norbornene, 5-hexyl-2-norbornene, 5-decyl-2-norbornene, 5-cyclohexyl-2-norbornene, 5-cyclopentyl-2-norbornene, 5-ethylidene-2-norbornene, 5-vinyl-2-norbornene, 5-propenyl-2-norbornene, 5-cyclohexenyl-2-norbornene, 5-cyclopentenyl-2-norbornene, 5-phenyl-2-norbornene, tetracyclo[9.2.1.0$^{2,10}$.0$^{3,8}$]tetradeca-3,5,7,12-tetraene, tetracyclo[10.2.1.0$^{2,11}$.0$^{4,9}$]pentadeca-4,6,8,13-tetraene, methyldicyclopentadiene, and dihydrodicyclopentadiene;
tetracyclo[6.2.1.1$^{3,6}$.0$^{2,7}$]dodec-4-enes with no substitution or comprising hydrocarbon substituent group;
bicyclo[2.2.1]hept-2-enes comprising alkoxycarbonyl group;
tetracyclo[6.2.1.1$^{3,6}$.0$^{2,7}$]dodec-4-enes comprising alkoxycarbonyl group;
bicyclo[2.2.1]hept-2-enes comprising hydroxycarbonyl group or acid anhydride group;
tetracyclo[6.2.1.1$^{3,6}$.0$^{2,7}$]dodec-4-enes comprising hydroxycarbonyl group or acid anhydride group;
bicyclo[2.2.1]hept-2-enes comprising hydroxyl group;
tetracyclo[6.2.1.1$^{3,6}$.0$^{2,7}$]dodec-4-enes comprising hydroxyl group;
bicyclo[2.2.1]hept-2-enes comprising hydrocarbonyl group;
tetracyclo[6.2.1.1$^{3,6}$.0$^{2,7}$]dodec-4-enes comprising hydrocarbonyl group;
bicyclo[2.2.1]hept-2-enes comprising alkoxycarbonyl group and hydroxycarbonyl group;
bicyclo[2.2.1]hept-2-enes comprising carbonyloxy group;
tetracyclo[6.2.1.1$^{3,6}$.0$^{2,7}$]dodec-4-enes comprising carbonyloxy group;
bicyclo[2.2.1]hept-2-enes comprising functional group including nitrogen atoms;
tetracyclo[6.2.1.1$^{3,6}$.0$^{2,7}$]dodec-4-enes comprising functional group including nitrogen atoms;
bicyclo[2.2.1]hept-2-enes comprising halogen atoms;
tetracyclo[6.2.1.1$^{3,6}$.0$^{2,7}$]dodec-4-enes comprising halogen atoms;
bicyclo[2.2.1]hept-2-enes comprising functional group including silicon atoms; and,
tetracyclo[6.2.1.1$^{3,6}$.0$^{2,7}$]dodec-4-enes comprising functional group including silicon atoms.

2. The cyclopentene ring-opening copolymer as set forth in claim 1 comprising oxysilyl group at a terminal of a copolymer chain.

3. A production method of the cyclopentene ring-opening copolymer of claim 1, comprising ring-opening copolymerization of the cyclopentene and the norbornene compound under the presence of (A) a compound of transition metal belonging to Group 6 in the Periodic Table, and (B) an organic aluminum compound expressed by below general formula (1);

$$(R^1)_{3-a-b}Al(OR^2)_a X_b \quad (1)$$

(in the above general formula (1), R1 is a hydrocarbon group having carbon atoms of 1 to 20, $R^2$ is a hydrocarbon group having carbon atoms of 1 to 20 which may comprise halogen atom, and X is halogen atom, "a" is 1 or 2, "b" is 0 or 1, and satisfying a+b <3).

4. The production method as set forth in claim 3, wherein the ring-opening copolymerization is carried out under the presence of (C) oxysilyl group containing olefinic unsaturated hydrocarbon in addition to (A) and (B), thereby producing the cyclopentene ring-opening copolymer including the structural unit derived from the cyclopentene and the structural unit derived from the norbornene compound,
wherein a content of the structural unit derived from a cyclopentene with respect to an entire structural unit of said copolymer is 50 to 85 wt % in terms of weight ratio, a content of the structural unit derived from a norbornene compound with respect to an entire structural unit of said copolymer is 15 to 50 wt % in terms of weight ratio, a weight average molecular weight (Mw) is 200,000 to 1,000,000, the glass transition temperature (Tg) of the ring opening copolymer is −40°

C. or more and −5° C. or less, and a cis/trans composition ratio of the double bond present in the main chain is 40/60 to 67/33, and comprising oxysilyl group at a terminal of a copolymer chain.

5. A rubber composition comprising a rubber component containing cyclopentene ring-opening copolymer of claim 1, and silica and/or carbon black.

6. The cyclopentene ring-opening copolymer as set forth in claim 1, wherein said norbornene compound is selected from 2-norbornene, 5-methyl-2-norbornene, 5-ethyl-2-norbornene, 5-ethylidene-2-norbornene, 5-vinal-2-norbornene, 5-phenyl-2-norbornene, methyldicyclopentadiene, tetracyclo[6.2.1.1$^{3,6}$.0$^{2,7}$]dodec-4-ene, 9-methyltetracyclo[6.2.1.1$^{3,6}$.0$^{2,7}$]dodec-4-ene, and tetracyclo[9.2.1.0$^{2,10}$.0$^{3,8}$]tetradeca-3,5,7,12-tetraene.

7. The cyclopentene ring-opening copolymer as set forth in claim 6, wherein said norbornene compound is selected from 5-phenyl-2-norbornene, tetracyclo[6.2.1.1$^{3,6}$.0$^{2,7}$]dodec-4-ene, tetracyclo[9.2.1.0$^{2,10}$.0$^{3,8}$]tetradeca-3,5,7,12-tetraene, and 2-norbornene.

* * * * *